(12) United States Patent
Sakai

(10) Patent No.: US 8,342,632 B2
(45) Date of Patent: Jan. 1, 2013

(54) PRINTER, PRINTING PROGRAM, AND PRINTING METHOD

(75) Inventor: Hiroaki Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/558,695

(22) Filed: Jul. 26, 2012

(65) Prior Publication Data

US 2012/0287448 A1 Nov. 15, 2012

Related U.S. Application Data

(63) Continuation of application No. 12/070,973, filed on Feb. 22, 2008, now Pat. No. 8,251,472.

(30) Foreign Application Priority Data

Feb. 23, 2007 (JP) .................................. 2007-043396

(51) Int. Cl.
*B41J 29/393* (2006.01)
*B41J 2/135* (2006.01)

(52) U.S. Cl. ......................................................... 347/14

(58) Field of Classification Search .................... 347/14, 347/47

See application file for complete search history.

(56) References Cited

U.S. PATENT DOCUMENTS
2006/0192803 A1 8/2006 Tanaka

FOREIGN PATENT DOCUMENTS
JP 2004-106470 A 4/2004

*Primary Examiner* — Jerry Rahll
(74) *Attorney, Agent, or Firm* — Global IP Counselors, LLP

(57) ABSTRACT

A printer includes a print head in which nozzles that form an image by discharging ink are arranged in a plurality of lines. The printer prints out an image on the basis of print form data in which information of layout contents of printing elements that form the content of print is set according to the attribute of each printing element. The printer includes a print form data storage unit, a printing element data storage unit, a print form data selection unit, a printing element data selection unit, and a printing element data insertion unit.

10 Claims, 17 Drawing Sheets

| FORM NUMBER | VERTICAL LENGTH OF CHARACTER REGION | STORAGE ADDRESS |

| FONT TYPE NUMBER | STORAGE ADDRESS |

| FONT SIZE NUMBER | VERTICAL LENGTH | STORAGE ADDRESS |

| SPECIFIC FORM NUMBER | STORAGE ADDRESS |

| ZIP CODE | ADDRESS | NAME |
|---|---|---|
| . . . | . . . | . . . |
| . . . | . . . | . . . |
| . . . | . . . | . . . |
| . . . | . . . | . . . |

DIRECT MAIL

| NAME | EMPLOYEE NUMBER | DEPART-MENT | CAPACITY | BASIC SALARY | . . . | . . . |
|---|---|---|---|---|---|---|
| . . . | . . . | . . . | . . . | . . . | . . . | . . . |
| . . . | . . . | . . . | . . . | . . . | . . . | . . . |
| . . . | . . . | . . . | . . . | . . . | . . . | . . . |
| . . . | . . . | . . . | . . . | . . . | . . . | . . . |

PAY SLIP

| NAME | CARD NUMBER | DATE | AMOUNT | POINT | . . . |
|---|---|---|---|---|---|
| . . . | . . . | . . . | . . . | . . . | . . . |
| . . . | . . . | . . . | . . . | . . . | . . . |
| . . . | . . . | . . . | . . . | . . . | . . . |
| . . . | . . . | . . . | . . . | . . . | . . . |

CARD HISTORY

FIG. 10

DETAILED STATEMENT

| DATE | AMOUNT | REMARKS |
|---|---|---|
| 2006/11/30 | ¥5,320 | XX STORE |
| | | X% DISCOUNT |
| 2006/12/1 | ¥2,563 | XX HOTEL |
| 2006/12/2 | ¥15,623 | XX LIQUOR SHOP |
| 2006/12/3 | ¥3,680 | XX LIQUOR SHOP |
| 2006/12/4 | ¥4,911 | XX LIQUOR SHOP |
| 2006/12/5 | ¥6,021 | XX LIQUOR SHOP |
| 2006/12/6 | ¥5,028 | XX LIQUOR SHOP |
| 2006/12/7 | ¥1,589 | XX STORE |
| 2006/12/8 | ¥2,374 | XX HOTEL |
| | | |
| | | |
| | | |

BEER

XX HOTEL

* USE SYSTEMATICALLY

AMOUNT BILLED
¥47,109

FIG. 11

DETAILED STATEMENT

| DATE | AMOUNT | REMARKS |
|---|---|---|
| 2006/11/30 | ¥5,320 | XX STORE |
| | | X% DISCOUNT |
| 2006/12/1 | ¥2,563 | XX HOTEL |
| 2006/12/2 | ¥15,623 | XX LIQUOR SHOP |
| 2006/12/3 | ¥3,680 | XX LIQUOR SHOP |
| 2006/12/4 | ¥4,911 | XX LIQUOR SHOP |
| 2006/12/5 | ¥6,021 | XX LIQUOR SHOP |
| 2006/12/6 | ¥5,028 | XX LIQUOR SHOP |
| 2006/12/7 | ¥1,589 | XX STORE |
| 2006/12/8 | ¥2,374 | XX HOTEL |
| | | |
| | | |
| | | |

XX HOTEL

BEER

| AMOUNT BILLED |
|---|
| ¥47,109 |

\* USE SYSTEMATICALLY

FIG. 18
| EXAMPLE NUMBER | LEFT REGION | CENTER REGION | RIGHT REGION | GROUPING |
|---|---|---|---|---|
| 1 | × | × | × | EXCLUDED |
| 2 | × | × | ○ | EXCLUDED |
| 3 | × | ○ | × | EXCLUDED |
| 4 | × | ○ | ○ | RIGHT |
| 5 | ○ | × | × | EXCLUDED |
| 6 | ○ | × | ○ | EXCLUDED |
| 7 | ○ | ○ | × | LEFT |
| 8 | ○ | ○ | ○ | UNIFORMITY |
FIG. 19A
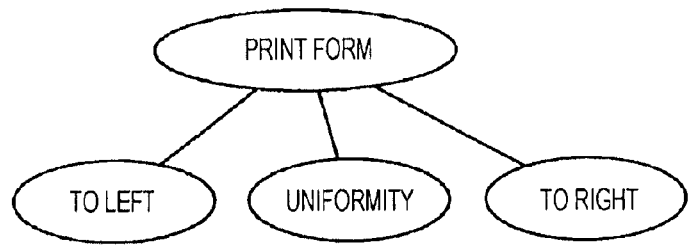
FIG. 19B
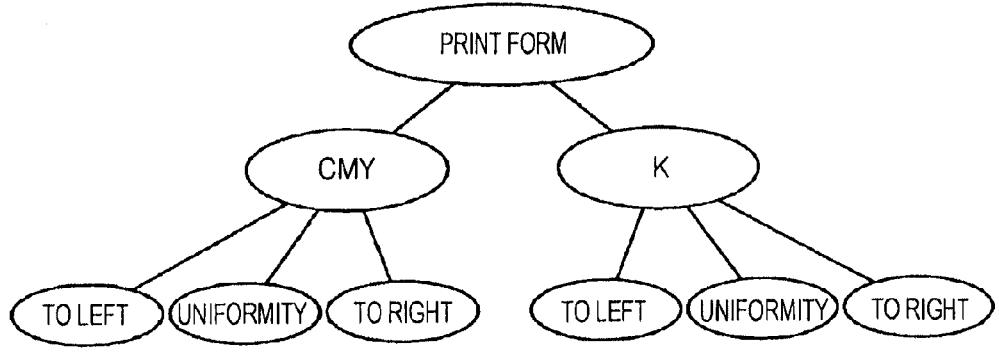

FIG. 20A
| OBJECT NUMBER | PERCENTAGE OF C USED [%] | PERCENTAGE OF M USED [%] | PERCENTAGE OF Y USED [%] | PERCENTAGE OF K USED [%] | ASSOCIATION |
|---|---|---|---|---|---|
| 0 | 20 | 35 | 25 | 11 | M |
| 1 | 32 | 13 | 21 | 15 | C |
| 2 | 21 | 24 | 38 | 12 | Y |
| 3 | 12 | 23 | 21 | 21 | M |
| 4 | 42 | 17 | 11 | 20 | C |
| 5 | 12 | 15 | 17 | 25 | K |
| . | . | . | . | . | |
| . | . | . | . | . | |
FIG. 20B
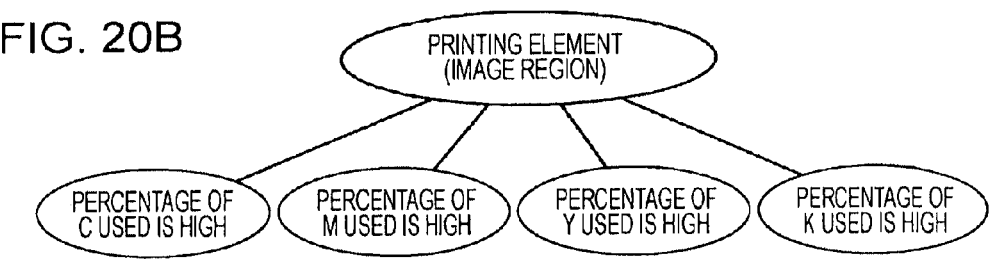
FIG. 21A
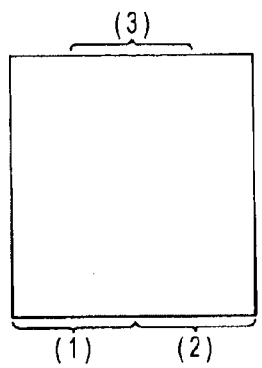
FIG. 21B
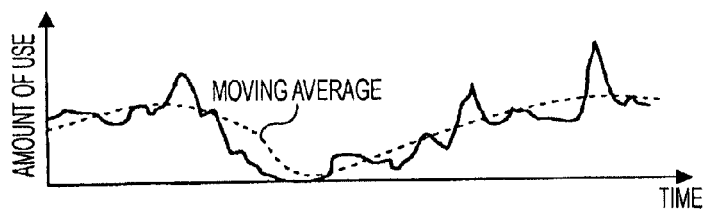

PRINTER, PRINTING PROGRAM, AND PRINTING METHOD

CROSS-REFERENCE TO RELATED APPLICATIONS

This is a continuation application of U.S. patent application Ser. No. 12/070,973 filed on Feb. 22, 2008, which claims priority to Japanese Patent Application No. 2007-043396 filed on Feb. 23, 2007. The entire disclosures of Japanese Patent Application No. 2007-043396 and U.S. patent application Ser. No. 12/070,973 is hereby incorporated herein by reference.

BACKGROUND

1. Technical Field

The present invention relates to a printer that prints out an image by discharging ink from nozzles, a printing program, and a printing method.

2. Related Art

For example, in an existing ink jet printer that prints out an image by discharging ink form nozzles, a process (which is called flushing, or the like) is performed to discharge ink from all the nozzles at a constant period of time during the printing process. In this manner, ink is prevented from clogging nozzles that are not used for printing. The above flushing technology is, for example, described as an ink jet recording apparatus in JP-A-2004-106470.

The ink jet recording apparatus described in JP-A-2004-106470 is provided with a head movement driving portion that reciprocally moves a line ink jet printer head, which performs a one-pass recording mode, in an array direction of its nozzles, that is, in a main scanning direction, and then executes a head movement process in which driving of the head movement driving portion is controlled to move the ink jet printer head in the array direction of the nozzles and a nozzle position modification process in which, in a direction opposite to the head movement direction at a pitch corresponding to the amount of shift of the ink jet printer head at this time, the positions of the nozzles, which discharge ink droplets, are shifted in the ink jet printer head as a whole. In this manner, the positions of the nozzles, which discharge ink droplets, are shifted in the ink jet printer head as a whole, so that nozzles that do not discharge ink are reduced, and, hence, it is less likely to cause an ink discharge defect in the nozzles.

However, in the existing art described in JP-A-2004-106470, an exclusive mechanism is required for shifting the nozzles, so that there is a possibility that an inconvenience, such as an enlarged size of apparatus, may occur.

SUMMARY

An advantage of some aspects of at least one embodiment of the invention is that it provides a printer, a printing program and a printing method, suitable for reducing ink clogging in nozzles that are not used during a printing process.

A first aspect of at least one embodiment of the invention provides a printer. The printer includes a print head in which nozzles that form an image by discharging ink are arranged in a plurality of lines. The printer prints out an image on the basis of print form data in which information of layout contents of printing elements that form the content of print is set according to the attribute of each printing element. The printer includes a print form data storage unit, a printing element data storage unit, a print form data selection unit, a printing element data selection unit, and a printing element data insertion unit. The print form data storage unit stores multiple pieces of print form data, which include different layout contents of the printing elements, according to the content of usage. The printing element data storage unit stores multiple types of pieces of printing element data, which correspond to pieces of data of the printing elements, according to the attribute of each printing element. The print form data selection unit randomly selects a piece of print form data, which is used for printing, from among the multiple pieces of print form data stored in the print form data storage unit. The printing element data selection unit selects a piece of printing element data corresponding to each piece of information of layout content that is set in the selected piece of print form data from among the multiple types of pieces of printing element data stored in the printing element data storage unit. The printing element data insertion unit inserts the selected piece of printing element data into the selected piece of print form data on the basis of information of the content of print, which is set in the selected piece of print form data.

According to the above configuration, a piece of print form data is randomly selected from among the multiple pieces of print form data, which include different layout contents of printing elements, the piece of printing element data having an attribute corresponding to each layout content of the piece of print form data that is randomly selected is inserted, and then printing may be performed. Therefore, when printing is continuously performed, printing may be performed by randomly selecting a piece of print form data every time.

In this manner, it is advantageous in that, during a period when printing is continuously performed, as compared to the case where printing is performed using the same print form every time, it is possible to reduce the number of nozzles that are not used or the number of nozzles that are extremely less frequently used. Thus, for example, when multiple sheets of documents having the same content of usage (purpose), such as direct mail, pay slip, or card history, are continuously printed, pieces of print form data, which include different layout contents of printing elements sheet by sheet, may be randomly changed. Thus, it is advantageous in that clogging of ink of nozzles that are not used in printing process may be reduced. Particularly, when the present aspect is applied to a printer that performs a flushing operation by which ink is discharged periodically from all the nozzles in order to prevent ink filled in the nozzles from getting dry, it is possible to reduce the number of flushing operations, the number of nozzles used for each flushing operation, or the like, without greatly changing the configuration of the printer. Furthermore, the number of flushing operations may be reduced in a printing process, so that it is possible to reduce the time required for printing in comparison with the existing printer. Particularly, the advantageous effects appear more remarkably as the number of prints increases.

Here, the print form data are data in which information of layout contents of printing elements that form the content of print is set according to the attribute of each printing element. The print form data include, for example, data that become templates of documents corresponding to the content of usage (purpose), such as direct mail or detailed statements, created using word processor software, or the like, data that become templates of arrangement of photographic images to print out images that are taken by a digital camera, or the like, in a predetermined layout, and the like. In addition, the print form data are formed to include information of a printing region and information of layout contents of pieces of printing element data, such as text data or image data, arranged in the printing region (for example, coordinates of layout positions (regions), layout conditions (character type, character size), and the like). Then, when printing is performed, a selected printing element is arranged (inserted) in each of the layout regions and printing is then performed. Thus, it is possible to easily create a document file or an image file according to the content of usage and then to print out the file. Hereinafter, the same applies to a printer of a third aspect, a printing program of seventh and eighth aspects and a printing method of ninth and tenth aspects.

In addition, the information of layout content, for text data, corresponds to, for example, character size, character type, character spacing, margin, and the like, in addition to the coordinate information of the above described layout content. In addition, the information of layout content, for image data, corresponds to, for example, information of resolution, information of palette (limitations of color representation, and the like), information of type of algorithm when an image is reduced or enlarged to be adjusted to the size of a layout region, and the like. Hereinafter, the same applies to a printer of a third aspect, a printing program of seventh and eighth aspects and a printing method of ninth and tenth aspects.

In addition, the random selection means, for example, in which serial numbers are assigned to pieces of print form data, a random number that falls within the range of the serial numbers is generated, and then a piece of print form data having a serial number equal to the generated random number is selected. Hereinafter, the same applies to a printer of a third aspect, a printing program of seventh and eighth aspects and a printing method of ninth and tenth aspects. In addition, the printing element data are data of printing elements that form the content of print, and include, for example, advertising copy and advertisement image, for direct mail, or the like, table data in which the content of detailed statements, such as pay slip or card history, is written, image data, document data, table data according to the content of usage other than the above. Hereinafter, the same applies to a printer of a third aspect, a printing program of seventh and eighth aspects and a printing method of ninth and tenth aspects.

Furthermore, the printer according to a second aspect of at least one embodiment of may be configured so that, in the printer of the first aspect, the print element data selection unit randomly selects a piece of printing element data corresponding to each piece of information of layout content set in the selected piece of print form data from among the multiple types of pieces of printing element data that are stored in the printing element data storage unit. According to the above configuration, because a piece of printing element data is arranged according to each layout content set in a piece of print form data from among pieces of printing element data stored according to the attribute of each printing element, it is advantageous in that it is possible to reduce deviation of nozzle usage frequencies depending on the type of printing element.

A third aspect of at least one embodiment of the invention provides a printer. The printer includes a print head in which nozzles that form an image by discharging ink are arranged in a plurality of lines. The printer prints out an image on the basis of print form data in which information of layout contents of printing elements that form the content of print is set according to the attribute of each printing element. The printer includes a print form data storage unit, a printing element data storage unit, a usage frequency calculation unit, a print form data selection unit, a printing element data selection unit, and a printing element data insertion unit. The print form data storage unit stores multiple pieces of print form data, which include different layout contents of the printing elements, according to the content of usage and in association with print form nozzle information that is information regarding the frequencies of use of the nozzles when printing is performed on the basis of the print form data. The printing element data storage unit stores multiple types of pieces of printing element data, which correspond to pieces of data of the printing elements, according to the attribute of each printing element. The usage frequency calculation unit calculates the frequencies of use of the nozzles on the basis of a piece of print form data, into which the piece of printing element data has been inserted and which has been printed before. The print form data selection unit selects a piece of print form data, which is used for printing, on the basis of the calculated frequencies of use from among the multiple pieces of print form data that are stored in the print form data storage unit. The printing element data selection unit selects a piece of printing element data corresponding to each piece of information of layout content that is set in the selected piece of print form data from among the multiple types of pieces of printing element data stored in the printing element data storage unit. The printing element data insertion unit inserts the selected piece of printing element data into the selected piece of print form data on the basis of information of the content of print, which is set in the selected piece of print form data.

According to the above configuration, it is possible to select, for example, a piece of print form data that uses nozzles having low frequencies of use or a piece of print form data that refrains from using nozzles having high frequencies of use in accordance with the frequencies of use of the nozzles calculated on the basis of a piece or pieces of print form data, which has been printed before and into which a piece of printing form data has been inserted. In this manner, because printing may be performed by selecting a piece of print form data that is appropriate according to the frequencies of use counted from a certain past time up to a present time, in a period when printing is continuously performed, as compared to the case where printing is performed using the same print form every time, it is advantageous in that it is possible to reduce the number of nozzles that are not used or the number of nozzles that are extremely less frequently used.

Particularly, when the present aspect is applied to a printer that performs a flushing operation as in the case of the first aspect, it is possible to reduce the number of flushing operations, the number of nozzles used for each flushing operation, or the like, without greatly changing the design of the printer. Furthermore, the number of flushing operations may be reduced in a printing process, so that it is possible to reduce the time required for printing in comparison with the existing printer. Particularly, the advantageous effects increase as the number of prints increases.

Here, the print form nozzle information is information regarding the frequencies of use of nozzles when a piece of printing element data is inserted into a piece of print form data and then an image is printed. For example, the print form nozzle information is obtained from the average value of the frequencies of nozzle usage, or the like, when, according to each piece of information of layout content that is set in each piece of print form data stored in the print form data storage unit, images of all pieces of printing element data, corresponding to the layout contents, that are stored in the printing element data storage unit are printed. For example, it is assumed that, in a certain piece of print form data, information of layout content is set to each of four printing elements. In this case, first, the average values of the frequencies of nozzles used to print out images of the printing elements, when all types of printing elements corresponding to the attribute of each piece of information of layout content are incorporated for the pieces of information, are calculated. Subsequently, using the average values of the frequencies of use of nozzles for four pieces of information of layout content, the frequencies of use of nozzles to print out an (entire) image of the piece of print form data are calculated. The thus calculated nozzle usage frequencies may be used as the print form nozzle information. Alternatively, from the information of the nozzle usage frequencies, for example, a distribution of nozzle usage frequencies is checked, and then information that represents the distribution of nozzle usage frequencies may be used as the print form nozzle information. Hereinafter, the same applies to a printing program of an eighth aspect and a printing method of a tenth aspect.

Furthermore, the printer according to a fourth aspect of at least one embodiment of the invention may be configured so that, in the printer of anyone of the first to third aspects, the information of layout content includes information of layout position of each printing element and information that indicates a layout condition corresponding to the attribute of each printing element, the information of layout position corresponding to each piece of printing element is set in advance in each piece of print form data, the printer further includes a layout condition information storage unit, a layout condition information selection unit and a layout condition information setting unit, the layout condition information storage unit stores multiple types of pieces of the layout condition information according to the attribute of each printing element, the layout condition information selection unit randomly selects a piece of layout condition information of a printing element for information of each layout content set in the selected piece of print form data from among the multiple types of pieces of layout condition information stored in the layout condition information storage unit, the layout condition information setting unit sets the piece of layout condition information, which is selected by the layout condition information selection unit, to the selected piece of print form data, the printing element data insertion unit inserts the piece of printing element data, which is selected by the printing element data selection unit, into the piece of print form data to which the piece of layout condition information is set.

According to the above configuration, because a piece of layout condition information of a printing element for information of each layout content may be randomly selected according to the selected piece of print form data, it is not necessary to prepare a piece of print form data for each layout condition. That is, it is only necessary that the print form data include minimum information, such as information of layout position, except layout condition information, and it is possible to greatly reduce the number of types of the information. Thus, it is advantageous in that it is possible to reduce the memory capacity of a storage unit that stores the print form data.

Here, the layout condition information, for text data, corresponds to, for example, character size, character type, character alignment, character spacing, margin, and the like. In addition, the layout condition information, for image data, corresponds to, for example, information of resolution, information of palette (limitations of color representation, and the like), information of type of algorithm when an image is reduced or enlarged to be adjusted to the size of a layout region, and the like.

Furthermore, the printer according to a fifth aspect of at least one embodiment of the invention may be configured so that, in the printer of the third or fourth aspect, the print form nozzle information includes information that indicates a distribution of the frequencies of use of the plurality of nozzles when printing is performed on the basis of the print form data.

According to the above configuration, the state of deviation of the frequencies of use of all the nozzles (to the left, at the center, to the right, uniformity, or the like) may be recognized from the print form nozzle information. Thus, it is advantageous in that it is possible to easily and appropriately select a piece of print form data in such a manner that a piece of print form data of which a distribution is appropriate in view of a distribution of overall usage frequencies recognized from the calculated frequencies of use is selected.

Furthermore, the printer according to a sixth aspect of at least one embodiment of the invention may be configured so that, in the printer of anyone of the third to fifth aspects, the multiple pieces of print form data are grouped into a plurality of groups according to the content of the print form nozzle information and then stored in the print form data storage unit, the print form data selection unit selects a group of pieces of print form data on the basis of the calculated frequencies of use from among the plurality of groups of pieces of print form data that are stored in the print form data storage unit, and randomly selects a piece of print form data, which is used for printing, from the selected group.

According to the above configuration, because a piece of print form data used for printing may be randomly selected from the selected group that is selected from among the plurality of groups of pieces of print form data that are stored according to the content of print form nozzle information, for example, it is advantageous in that, when the pieces of print form data in the same group are continuously used, it is possible to absorb a variation in frequencies of nozzle usage in each group. In this manner, it is advantageous in that it is possible to reduce the occurrence of deviation of nozzle usage frequencies over all the nozzles.

Furthermore, the printer according to a seventh aspect of at least one embodiment of the invention may be configured so that, in the printer of the sixth aspect, the multiple pieces of printing element data are grouped into a plurality of groups according to the content of printing element nozzle information regarding the frequencies of use of the nozzles when an image of the printing element data is printed and then stored in the printing element data storage unit, the printing element data selection unit selects a group of printing element data for each piece of information of layout content set in the selected piece of print form data on the basis of the calculated frequencies of use from among the multiple types of pieces of printing element data stored in the printing element data storage unit for each layout content, and randomly selects a piece of printing element data for each layout content from each selected group.

According to the above configuration, because a piece of printing element data used for printing may be randomly selected from the group of pieces of printing element data that are stored according to the content of printing element nozzle information, for example, it is advantageous in that, when the pieces of printing element data in the same group are continuously used, it is possible to absorb a variation in frequencies of nozzle usage in each group. In this manner, because it is possible to reduce the occurrence of deviation of the frequencies of use of nozzles to print out each printing element, it is advantageous in that it is possible to reduce a deviation of nozzle usage frequencies over all the nozzles.

An eighth aspect of at least one embodiment of the invention provides a printing program that is used to control a printer. The printer includes a print head in which nozzles that form an image by discharging ink are arranged in a plurality of lines. The printer prints out an image on the basis of print form data in which information of layout contents of printing elements that form the content of print is set according to the attribute of each printing element. The printing program is used to execute a process on a computer. The process includes randomly selecting a piece of print form data, which is used for printing, from among multiple pieces of print form data stored in a print form data storage unit that stores the multiple pieces of print form data, which include different layout contents of the printing elements, according to the content of usage, selecting a piece of printing element, data for each piece of information of layout content that is set in the selected piece of print form data from among multiple types of pieces of printing element data stored in a printing element data storage unit that stores the multiple types of pieces of printing element data, which correspond to pieces of data of the printing elements, according to the attribute of each printing element, and inserting the selected piece of printing element data into the selected piece of print form data on the basis of information of the content of print, which is set in the selected piece of print form data.

With this configuration, when the program is read by the computer and, in accordance with the read program, the computer executes a process, the same function and advantageous effects as in the case of the printer of the first aspect are obtained. Almost all printers, such as ink jet printers, which are now commercially available, are provided with a computer system formed by a central processing unit (CPU), a storage device (RAM, ROM), an input/output device, or the like, and are able to implement the above described units using the computer system through software, so that it is possible to economically and easily implement the units in comparison with a case where the above units are implemented by creating an exclusive hardware.

Furthermore, by rewriting a portion of the program, it is possible to easily upgrade the software for function modifications and/or improvements. Note that the above aspect may be configured to include a program that instructs the computer to execute the functions implemented by the units of the above second aspect or the fourth aspect.

A ninth aspect of the invention provides a printing program that is used to control a printer. The printer includes a print head in which nozzles that form an image by discharging ink are arranged in a plurality of lines. The printer prints out an image on the basis of print form data in which information of layout contents of printing elements that form the content of print is set according to the attribute of each printing element. The printing program is used to execute a process on a computer. The process includes calculating the frequencies of use of the nozzles on the basis of a piece of print form data, into which the piece of printing element data has been inserted and which has been printed before, selecting a piece of print form data, which is used for printing, on the basis of the calculated frequencies of use from among multiple pieces of print form data that are stored in a print form data storage unit that stores the multiple pieces of print form data, which include different layout contents of the printing elements, according to the content of usage and in association with print form nozzle information that is information regarding the frequencies of use of the nozzles when printing is performed on the basis of the print form data, selecting a piece of printing element data for each piece of information of layout content that is set in the selected piece of print form data from among multiple types of pieces of printing element data stored in a printing element data storage unit that stores the multiple types of pieces printing element data, which correspond to pieces of data of the printing elements, according to the attribute of each printing element, and inserting the selected piece of printing element data into the selected piece of print form data on the basis of information of the content of print, which is set in the selected piece of print form data.

With this configuration, when the program is read by the computer and, in accordance with the read program, the computer executes a process, the same function and advantageous effects as in the case of the printer of the third aspect are obtained. Almost all the printers, such as ink jet printers, which are now commercially available, are provided with a computer system formed by a central processing unit (CPU), a storage device (RAM, ROM), an input/output device, or the like, and are able to implement the above described units using the computer system through software, so that it is possible to economically and easily implement the units in comparison with a case where the above units are implemented by creating an exclusive hardware.

Furthermore, by rewriting portion of the program, it is possible to easily upgrade the software for functional modifications and/or improvements. Note that the above aspect may be configured to include a program that instructs the computer to execute the functions implemented by the units of anyone of the above fourth to seventh aspects and to limit data configuration.

A tenth aspect of the invention provides a printing method that is used to control a printer. The printer includes a print head in which nozzles that form an image by discharging ink are arranged in a plurality of lines. The printer prints out an image on the basis of print form data in which information of layout contents of printing elements that form the content of print is set according to the attribute of each printing element. The printing method includes randomly selecting a piece of print form data, which is used for printing, from among multiple pieces of print form data stored in a print form data storage unit that stores the multiple pieces of print form data, which include different layout contents of the printing elements, according to the content of usage, selecting a piece of printing element data for each piece of information of layout content that is set in the selected piece of print form data from among multiple types of pieces of printing element data stored in a printing element data storage unit that stores the multiple types of pieces of printing element data, which correspond to pieces of data of the printing elements, according to the attribute of each printing element, and inserting the selected piece of printing element data into the selected piece of print form data on the basis of information of the content of print, which is set in the selected piece of print form data. In this manner, the same function and advantageous effects as in the case of the printer of the first aspect are obtained. Note that the above aspect may be configured so that the units of the above second or fourth aspect are replaced by steps.

An eleventh aspect of at least one embodiment of the invention provides a printing method that is used to control a printer. The printer includes a print head in which nozzles that form an image by discharging ink are arranged in a plurality of lines. The printer prints out an image on the basis of print form data in which information of layout contents of printing elements that form the content of print is set according to the attribute of each printing element. The printing method includes calculating the frequencies of use of the nozzles on the basis of a piece of print form data, into which the piece of printing element data has been inserted and which has been printed before, selecting a piece of print form data, which is used for printing, on the basis of the calculated frequencies of use from among multiple pieces of print form data that are stored in a print form data storage unit that stores the multiple pieces of print form data, which include different layout contents of the printing elements, according to the content of usage and in association with print form nozzle information that is information regarding the frequencies of use of the nozzles when printing is performed on the basis of the print form data, selecting a piece of printing element data for each piece of information of layout content that is set in the selected piece of print form data from among multiple types of pieces of printing element data stored in a printing element data storage unit that stores the multiple types of pieces printing element data, which correspond to pieces of data of the printing elements, according to the attribute of each printing element, and inserting the selected piece of printing element data into the selected piece of print form data on the basis of information of the content of print, which is set in the selected piece of print form data.

In this manner, the same function and advantageous effects as in the case of the printer of the third aspect are obtained. Note that the above aspect may be configured so that the units of anyone of the above fourth to seventh aspects are replaced by steps and data configuration is limited.

BRIEF DESCRIPTION OF THE DRAWINGS

The invention will be described with reference to the accompanying drawings, wherein like numbers reference like elements.

FIG. 10 is a view that shows a first example of a printing result when a piece of print form data is selected randomly.

FIG. 11 is a view that shows a second example of a printing result when a piece of print form data is selected randomly.

FIG. 18 is a view that shows the comparison results between a score of each region, defined in each of the pieces of print form data shown in FIG. 17, and a threshold value.

FIG. 19A is a view that shows a group configuration when grouping is performed with respect to CMYK, and FIG. 19B is a view that shows a group configuration when CMYK are separated into CMY and K and grouping is performed separately with respect to each of CMY and K.

FIG. 20A is a view that shows the relationship between a piece of printing element data corresponding to an image region and the frequency of use of nozzles corresponding to each ink color, and FIG. 20B is a view that shows a group configuration of pieces of printing element data corresponding to an image region when grouping is performed on the basis of the relationship of FIG. 20A.

FIG. 21A is a view that shows an example in which a printing region is divided in a process to recognize the frequencies of nozzle usage, and FIG. 21B is a view that shows an example of a moving average that is obtained for each divided region shown in FIG. 21A.

DETAILED DESCRIPTION OF EXEMPLARY EMBODIMENTS

First Embodiment

Figure 1:
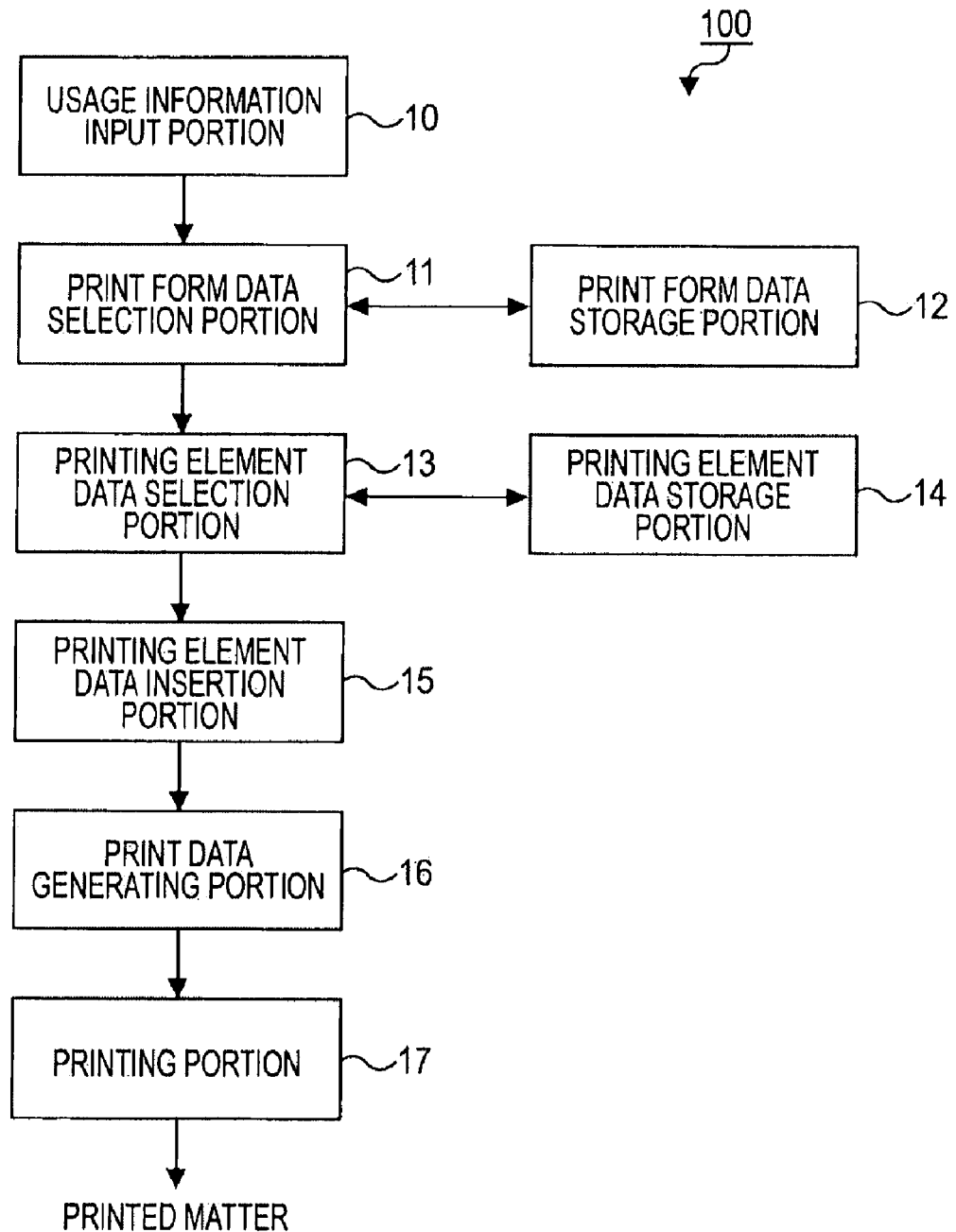
FIG. 1 is a block diagram that shows the configuration of a printer according to a first embodiment of the invention.

Hereinafter, a first embodiment of the invention will be described with reference to the accompanying drawings. FIG. 1 to FIG. 11 are views that show a first embodiment of a printer, a printing program and a printing method according to the first embodiment of the invention. First, the configuration of the printer according to the first embodiment of the invention will be described with reference to FIG. 1. FIG. 1 is a block diagram that shows the configuration of the printer 100 according to the first embodiment of the invention.

As shown in FIG. 1, the printer 100 includes a usage information input portion 10, a print form data selection portion 11, a print form data storage portion 12, a printing element data selection portion 13, and a printing element data storage portion 14. The usage information input portion 10 inputs usage information that indicates the usage of a printed matter. The print form data selection portion 11 randomly selects a piece of print form data corresponding to the content of usage from the print form data storage portion 12, which will be described later. The print form data storage portion 12 stores multiple types of pieces of print form data according to the content of usage. The printing element data selection portion 13 selects a piece of printing element data corresponding to each piece of layout content information of the selected piece of print form data from the printing element data storage portion 14, which will be described later. The printing element data storage portion 14 stores multiple types of pieces of printing element data according to the attribute.

The usage information input portion 10 has a function of inputting usage information, which is input by a user through an input device (not shown), into the print form data selection portion 11. The usage information may be, for example, information corresponding to the content of usage of a printed matter, such as direct mail, pay slip, or card history. Note that, in the present embodiment, the content of usage is input in such a manner that a list of selectable contents of usage is displayed in advance, a user is allowed to select anyone of the contents of usage from among the contents of usage displayed in the list through an input device 74, which will be described later, and the information of the selected content of usage is input.

The print form data selection portion 11 has a function of randomly selecting, on the basis of usage information that is input through the usage information input portion 10, a piece of print form data corresponding to the usage information from the print form data storage portion 12. Specifically, the print form data storage portion 12 stores multiple types of pieces of print form data, which include different layout contents of printing elements that are set in advance in correspondence with the content of usage, according to the content of usage, and the print form data selection portion 11 randomly selects a piece of print form data, which is used for printing, from among multiple types of pieces of print form data that belong to the content of usage corresponding to the input usage information.

In addition, in the present embodiment, the above usage information includes information of the number of prints, and the print form data selection portion 11 randomly selects pieces of print form data for the number of prints. For example, when the number of prints (or the number of sheets printed) is five, the print form data selection portion 11 randomly selects five pieces of print for-data. In addition, the printer 100 is also configured, as a first configuration, to randomly determine the layout condition of each piece of printing element data, which will be arranged at a layout position indicated by the information of each layout content according to the attribute of each printing element, for the print form data that is selected by the print form data selection portion 11. In this case, the print form data storage portion 12 stores pieces of print form data of which information of layout content does not include information of layout condition except the attribute of printing element, which will be arranged, and the information of layout position, and multiple types of pieces of information of layout condition according to the attribute of each printing element. Then, the print form data selection portion 11, after randomly selecting a piece of print form data, subsequently generates a random number for each piece of information of layout content set in the selected piece of print form data and randomly selects a piece of layout condition information.

In the present embodiment, the layout condition information may be selected only for a region into which characters (text) are inserted as a printing element, and two layout conditions, which are font type and font size, are randomly selected. In addition, the layout condition information of font type is stored in association with second searching information that includes a font type number and an address at which font type information corresponding to the font type number is stored. In addition, the layout condition information of font size is stored in association with third searching information that includes a font size number, information of length in the vertical direction (hereinafter, referred to as vertical length) of font corresponding to the font size number in a certain font type, and information of font size.

In addition, the printer 100 may be configured, as a second configuration, so that the information of layout condition is included in information of each layout content that is set in each piece of print form data in advance, and the print form data selection portion 11 randomly selects a piece of print form data in which layout condition information is set in advance. In this case, the print form data storage portion 12 stores a piece of print form data in which not only information of each layout content but also information of layout condition of a printing element corresponding to each layout content are set. Then, the print form data selection portion 11 generates a random number and randomly selects a piece of print form data from the print form data storage portion 12.

The print form data storage portion 12, as described above, has a function of storing multiple types of pieces of print form data, which include different layout contents of printing elements that form the content of print, according to the content of usage. In addition, the print form data has a database configuration so that each of the pieces of print form data is stored, according to the content of usage, in association with first searching information that includes a form number that is a serial number with respect to all types of pieces of print form data, the vertical length of a region into which characters (text) are inserted, and a storage address of each piece of print form data, and each of the pieces of print form data may be searched through the first searching information using a random number generated by the print form data selection portion 11 as a keyword.

In addition, the print form data storage portion 12, when configured as the above first configuration, stores pieces of print form data that do not include layout condition information and that are associated with the above pieces of first searching information, and also stores pieces of layout condition information corresponding to the font type and character size in association with the above pieces of second searching information and the above pieces of third searching information. On the other hand, the print form data storage portion 12, when configured as the second configuration, stores pieces of print form data that include pieces of layout condition information in association with pieces of fourth searching information that include a specific form number and a storage address of a piece of print form data corresponding to the specific form number.

The printing element data selection portion 13 has a function of selecting a piece of printing element data corresponding to each piece of information of layout content of each printing element that is set in the piece of print form data selected by the print form data selection portion 11 on the basis of the information of layout content from the printing element data storage portion 14. Here, the information of layout content according to which each printing element is arranged is set in the piece of print form data according to the attribute of each printing element. In the present embodiment, a piece of printing element data corresponding to the attribute of information of each layout content is selected from among pieces of printing element data that are stored in the printing element data storage portion 14 in a predetermined sequence or randomly in accordance with the set selection mode. That is, in the present embodiment, the printing element data selection portion 13 has two modes as the selection mode: a sequential selection mode and a random selection mode.

The printing element data storage portion 14 has a function of storing multiple types of pieces of printing element data according to the content of usage of a printed matter and also according to the attribute of each printing element. The attribute of the printing element data includes, for example, an advertisement image and an advertising copy for direct mail, or the like, and a table image (ruled line and text) in pay slip, card history, or the like. Note that, because text sentences, table data, and the like, are mainly composed of text data, regions in which these printing elements are arranged are termed as character region. In addition, regions in which printing elements composed of image data other than text data, such as an advertisement image, are termed as image region.

In addition, pieces of printing element data, of which all types have assigned serial numbers, are stored according to the content of usage of a printed matter and according to the attribute of each printing element. Furthermore, as shown in FIG. 1, the printer 100 further includes a printing element data insertion portion 15, a print data generating portion 16, and a printing portion 17. The printing element data insertion portion 15 inserts a piece of printing element data, which is selected by the printing element data selection portion 13, into a piece of print form data. The print data generating portion 16 generates print data using the piece of print form data into which each piece of printing element data is inserted. The printing portion 17 prints out an image on the basis of the print data.

The printing element data insertion portion 15 has a function of inserting the piece of printing element data that is selected by the printing element data selection portion 13 into the piece of print form data that is selected by the print form data selection portion 11. Specifically, the printing element data insertion portion 15 inserts the piece of printing element data, which is selected for each piece of layout content information, on the basis of information of layout position (coordinates) included in each piece of layout content information and layout condition information included in each piece of layout content information. In this manner, a piece of print form data, for which each piece of printing element data is inserted into a position (region) corresponding to each piece of layout position information, is formed.

The print data generating portion 16 has a function of generating print data to print out an image, formed of printing elements that are arranged at respective layout positions, on the basis of a piece of print form data into which each piece of printing element data is inserted by the printing element data insertion portion 15. Specifically, the print data generating portion 16 converts an image, formed of the printing elements, into data that indicate the on/off of dots that will be formed by the print head 200, which will be described later, of the printing portion 17.

Figure 2:
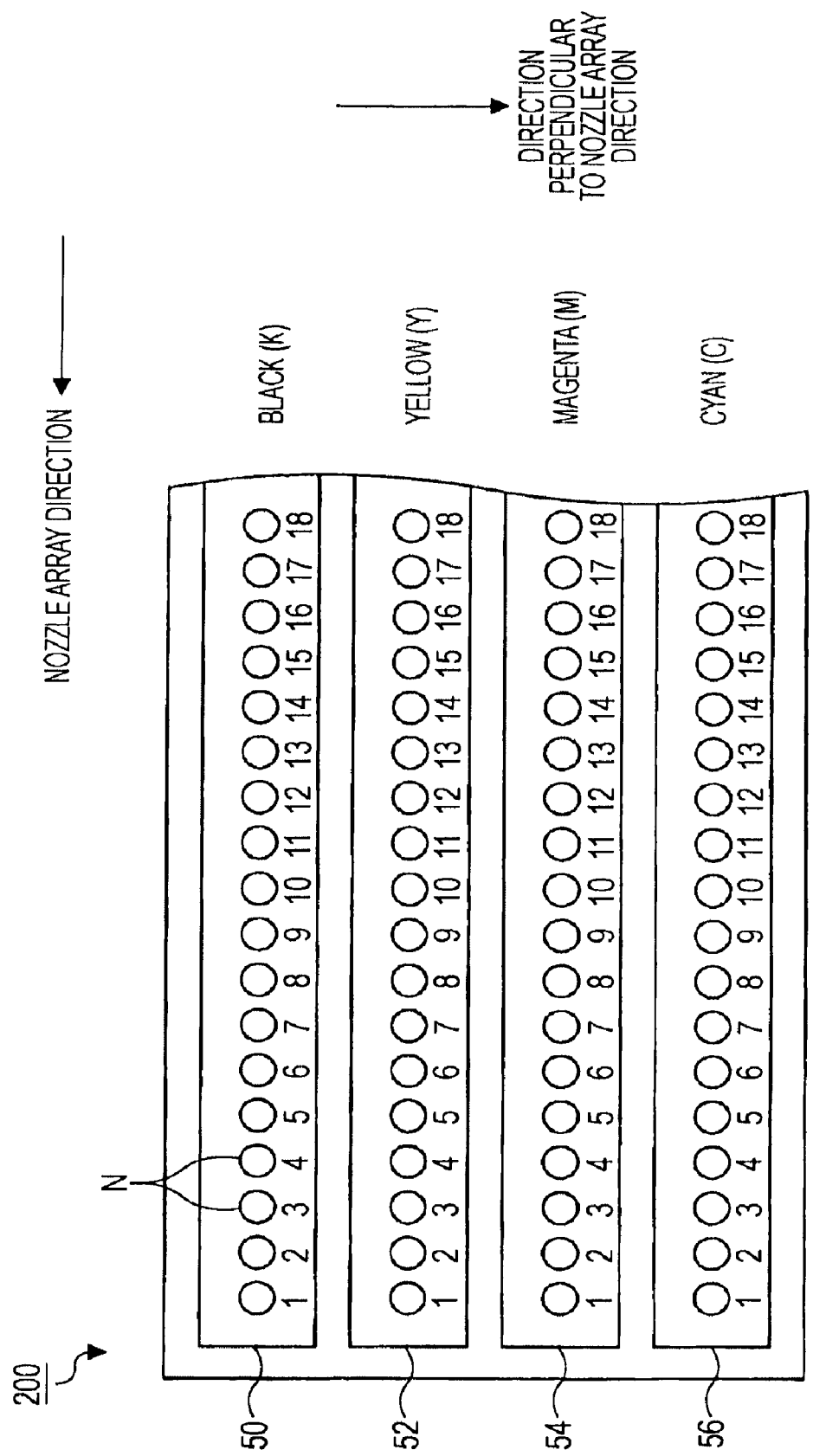
FIG. 2 is a partially enlarged bottom view that shows the structure of a print head.

Here, the print head 200 applied to the embodiment of the invention will be described. FIG. 2 is a partially enlarged bottom view that shows the structure of the print head 200. As shown in FIG. 2, the print head 200 has a longitudinal structure extending in a paper width direction of print paper used in a so-called line head ink jet printer. The print head 200 is formed so that four nozzle modules 50, 52, 54, 56 are integrally arranged so as to form multi-lines and overlap in a print direction (a direction perpendicular to the nozzle array direction; strictly speaking, a dot print direction of nozzles). The black nozzle module 50 includes a plurality of nozzles N (eighteen in the drawing) that exclusively discharge black (K) ink and are arranged in a straight line. The yellow nozzle module 52 includes a plurality of nozzles N that exclusively discharge yellow (Y) ink and are arranged in a straight line along the same direction. The magenta nozzle module 54 includes a plurality of nozzles N that exclusively discharge magenta (M) ink and are arranged in a straight line along the same direction. The cyan nozzle module 56 includes a plurality of nozzles N that exclusively discharge cyan (C) ink and are arranged in a straight line along the same direction. Note that, when a print head is designed for monochrome printing, only a black (K) may be used, or, when a print head is designed for a high-quality image, six colors of ink or more that further includes light magenta, light cyan, or the like, may be used.

In addition, the above configured print head 200 prints circular dots on a white print sheet of paper by discharging ink, which is supplied into ink chambers (not shown) that are respectively provided for nozzles N1, N2, N3, . . . , through the nozzles N1, N2, N3, . . . , using piezoelectric elements, such as piezoactuators (not shown), which are provided for the respective ink chambers. Moreover, the print head 200 is able to print dots having different sizes for each nozzle N1, N2, N3, . . . , by adjusting the amount of ink discharged from the ink chambers by controlling electric voltage applied to the piezoelectric elements among multiple levels.

Note that the above described dot means a region formed by ink that is discharged from one or plurality of nozzles and is adhered on a printing medium. Moreover, an area of "dot" is not "zero". The dot, of course, has a certain size (area) and, in addition, dots may have various sizes. However, dots formed by discharging ink do not always become a perfect circle. For example, when dots are formed in a shape other than perfect circle, such as ellipse, its average diameter is used as a dot diameter, or a perfect circle equivalent dot having the same area as an area of a dot formed by discharging a certain amount of ink is assumed and the diameter of the equivalent dot is used as a dot diameter.

Referring back to FIG. 1, the printing portion 17 is an ink jet printer such that a predetermined image is formed by a single scanning on a medium (hereinafter referred to as printing medium) used for printing by ejecting ink in a dot 42 like shape from the nozzle modules 50, 52, 54, 56, which are formed in the print head 200, while moving one of the medium (for example, print paper, or the like) used for printing or the print head 200 or both. In addition to the above described print head 200, the printing portion 17 further includes a paper feed mechanism (not shown) used for moving the printing medium, a print controller mechanism (not shown) that controls discharging of ink of the print head 200, and the like.

Figure 3:
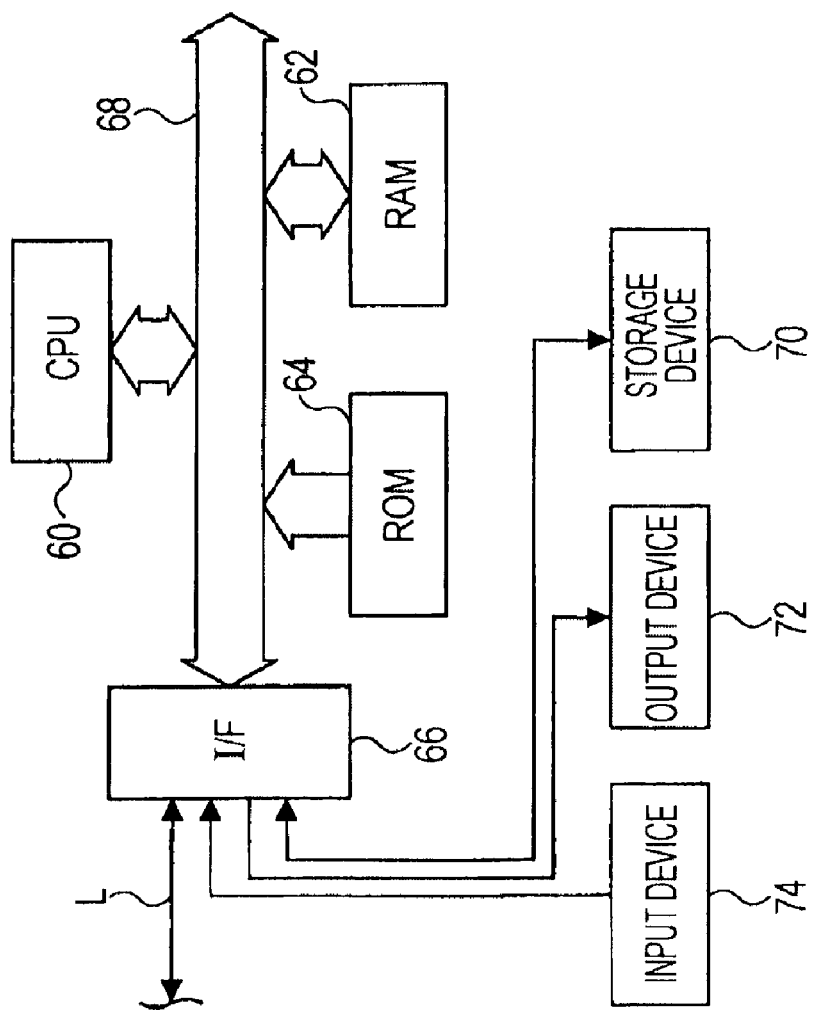
FIG. 3 is a block diagram that shows the hardware configuration of the printer.

Note that, as described above, printing that is performed by inserting pieces of printing element data corresponding to pieces of layout content information into a piece of print form data, for which layout content information of each printing element that forms the content of print is set, is usually called variable printing. In addition, the printer 100 is provided with a computer system that implements the usage information input portion 10, the print form data selection portion 11, the printing element data selection portion 13, the printing element data insertion portion 15, the print data generating portion 16, the printing portion 17, and the like, on the computer software. The hardware configuration of the printer 10a, as shown in FIG. 3, connects, using various internal and external buses 68 formed of a PCI {Peripheral Component Interconnect) bus, and the like, a CPU (Central Processing Unit) 60 that executes various controls and processes for printing, a RAM (Random Access Memory) 62 that constitutes a main storage device (Main Storage), a ROM (Read Only Memory) 64 that is a read only storage device, and connects a storage device (Secondary Storage) 70, such as HDD (Hard Disk Drive) that constitutes the print form data storage portion 12, the printing element data storage portion 14, and the like, an output device 72, such as the printing portion 17, a CRT, or an LCD monitor, the input device 74, such as the usage information input portion 10, an operation panel, a mouse, a keyboard, or a scanner, and a network L for communication with a print instruction device (not shown), or the like, to the buses 68 through an input/output interface (I/F) 66.

When the power is turned on, a system program of BIOS, or the like, stored in the ROM 64, or the like, loads various exclusive computer programs, which are stored in the ROM 64 in advance, onto the RAM 62. In accordance with the instructions described in the programs loaded onto the RAM 62, the CPU 60 uses various resources to execute a predetermined control and processing, thus implementing the above described functions through the software.

Figure 4:
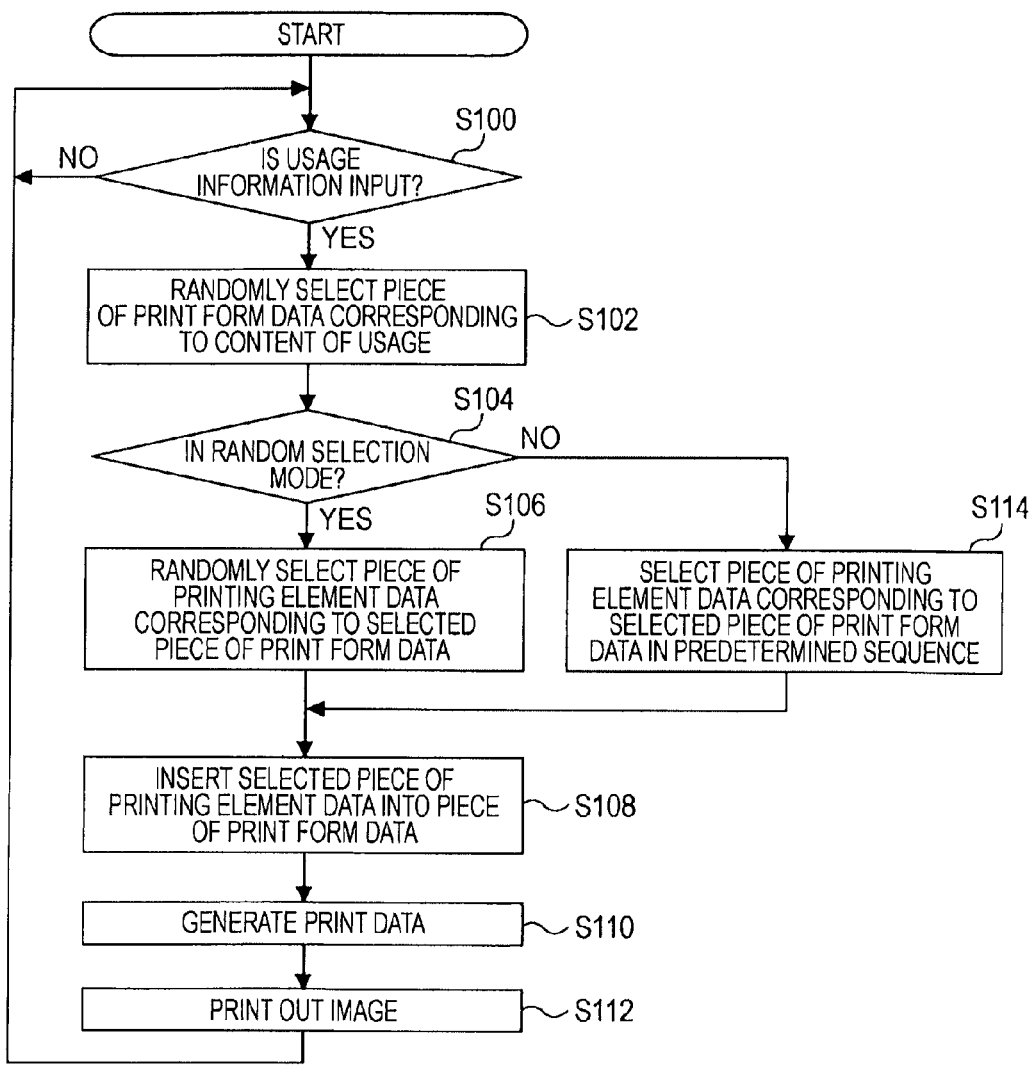
FIG. 4 is a flowchart that shows a printing process executed in the printer.

Next, the flow of a printing process in the above configured printer 100 will be described with reference to FIG. 4. Here, FIG. 4 is a flowchart that shows the printing process executed in the printer 100. The printing process, as shown in FIG. 4, first proceeds to step 5100, and the usage information input portion 10 determines whether usage information is input from a print instruction terminal, or the like (not shown), such as a personal computer. When it is determined that usage information is input (Yes), the input usage information is output to the print form data selection portion 11 and then the process proceeds to step 5102. When a negative determination is made (No), the process repeats a determination process until usage information is input.

When the process proceeds to step 5102, the print form data selection portion 11 randomly selects a piece of print form data corresponding to the usage information that is input through the usage information input portion 10 from the print form data storage portion 12, and then the process proceeds to step 5104. In step 5104, the printing element data selection portion 13 determines whether the random selection mode is set as a selection mode to select printing element data. When it is determined that the random selection mode is set (Yes), the process proceeds to step 8106. When a negative determination is made (No), the process proceeds to step 8114.

When the process proceeds to step 8106, the printing element data selection portion 13 randomly selects a piece of information of layout content, which is set in the piece of print form data selected in step 8102, from the printing element data storage portion 14. In step 8108, the printing element data insertion portion 15 inserts a piece of printing element data selected in step 8106 or in step 8114 into the corresponding piece of print form data selected in step 8102 on the basis of a piece of layout content information and layout condition information, and then the process proceeds to step 8110.

In step 8110, the print data generating portion 16 generates print data on the basis of the piece of print form data into which the piece of printing element data is inserted in step 8108, and then the process proceeds to step 8112. In step 8112, the printing portion 17 prints out images, formed by the piece of printing element data that is inserted in step 8108, on the basis of the print data generated in step 8110, after which a series of processes ends and the process proceeds to step 8100.

On the other hand, in step 8104, when not the random selection mode, but the sequential selection mode, is set and the process proceeds to step 8114, the printing element data selection portion 13 selects a piece of printing element data corresponding to a piece of information of layout content set in the piece of print form data selected in step 8102 from the printing element data storage portion 14 in a sequence that is set in advance, and then the process proceeds to step 8108.

Figure 5:
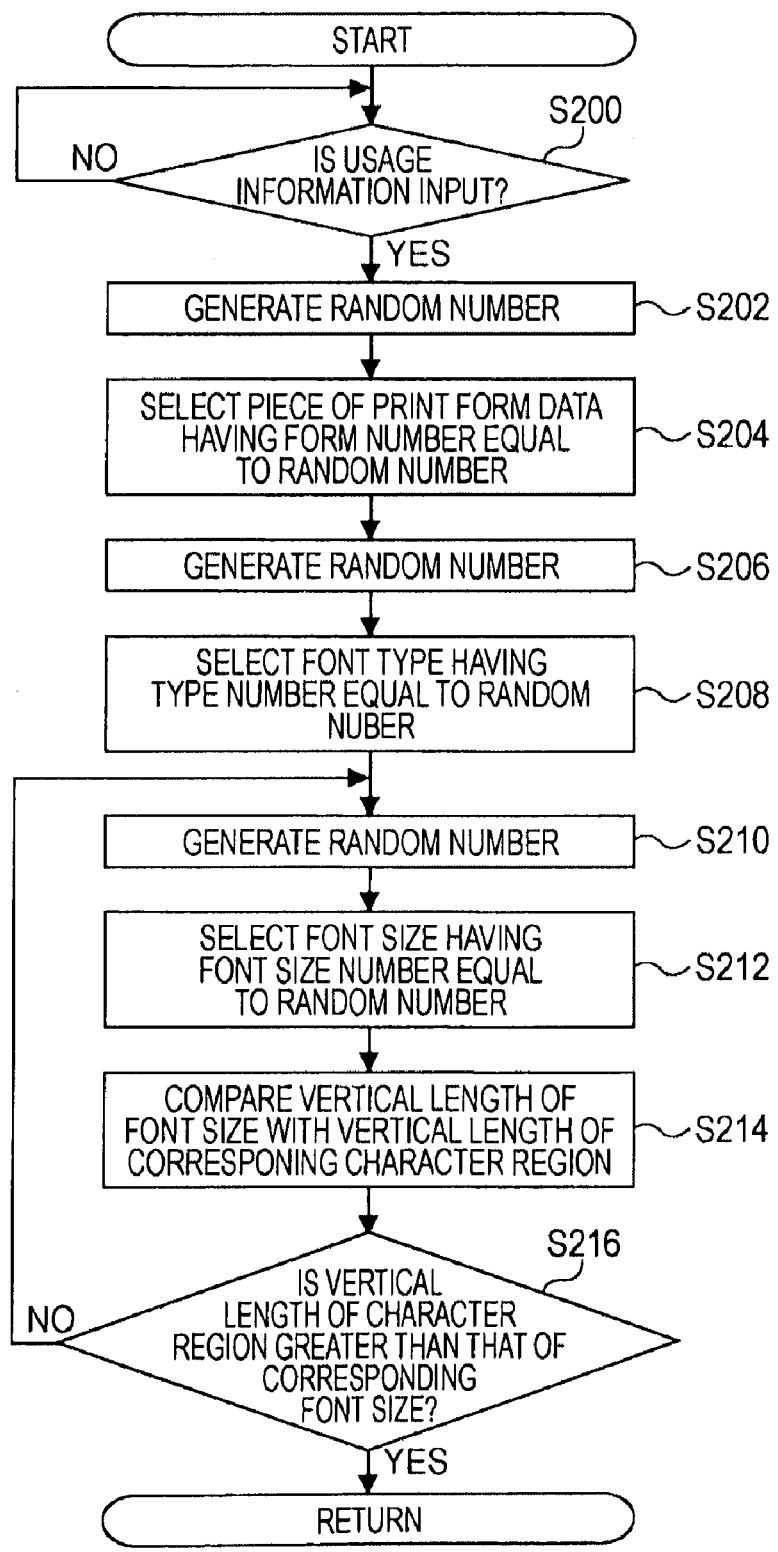
FIG. 5 is a flowchart that shows a process to select a piece of print form data when layout condition information is randomly selected.

Furthermore, the flow process to select a piece of print form data when each piece of layout condition information is randomly selected will be described with reference to FIG. 5. Here, FIG. 5 is a flowchart that shows the process to select a piece of print form data when a piece of layout condition information is randomly selected. In the process to select a piece of print form data, as shown in FIG. 5, the process first proceeds to step 8200, and the print form data selection portion 11 determines whether usage information is input. When it is determined that usage information is input (Yes), the process proceeds to step 8202. When a negative determination is made (No), the process repeats a determination process until usage information is input.

When the process proceeds to step 8202, the print form data selection portion 11 generates a random number for selecting a piece of print form data, and then the process proceeds to step 8204. Here, in order to generate a random number, a known linear congruential method, MT (Mersenne Twister) method, or the like, may be used. When a rate of generation is important, the former linear congruential method is used. When an accuracy of random number is important, the latter MT method is used. Note that the range of a random number is made equal to the range of the form number included in the first searching information. This also applies to a process to generate a random number in the following steps.

In step 8204, the print form data selection portion 11 searches a piece of first searching information having the form number equal to the random number generated in step 8202, and selects (reads out) a piece of print form data, which is stored at an address included in the piece of first searching information retrieved through the searching, from the print form data storage portion 12, and then the process proceeds to step 8206. In step 8206, the print form data selection portion 11 generates a random number to select font type information, which is one of the pieces of layout condition information, for information of layout content corresponding to each character region in the information of layout content set in the piece of print form data that is selected in step 5204, and then the process proceeds to step 5208.

In step 5208, the print form data selection portion 11 searches a piece of second searching information having the font type number that is equal to the random number generated in step 5206, and selects (reads out) a piece of font type information, which is stored at an address included in the piece of second searching information, from the print form data storage portion 12, and then the process proceeds to step 5210. In step 5210, the print form data selection portion 11 generates a random number to select font size information, which is one of the pieces of layout condition information, for information of layout content corresponding to each character region in the information of layout content set in the piece of print form data that is selected in step 5204, and then the process proceeds to step 8212.

In step 5212, the print form data selection portion 11 searches a piece of third searching information having the font size number that is equal to the random number generated in step 5210, and selects (reads out) a piece of font size information, which is stored at an address included in the piece of third searching information, from the print form data storage portion 12, and then the process proceeds to step 8214. In step 8214, the print form data selection portion 11 compares the vertical length of a layout content of a character region set in the piece of print form data selected in step 8204 with the vertical length included in the font size information that is selected in step 8212, and then the process proceeds to step 8216.

In step 8216, the print form data selection portion 11 determines, on the basis of the result compared in step 8214, whether the vertical length of the character region is greater than the vertical length of the selected font size. When the determination is affirmative (Yes), the selected font type information and font size information are set for the selected piece of print form data, after which a series of processes ends and the process proceeds to the original process. When a negative determination is made (No), the process proceeds to step 8212. Then, a random number is generated again, and font size information is reselected.

Figure 6:
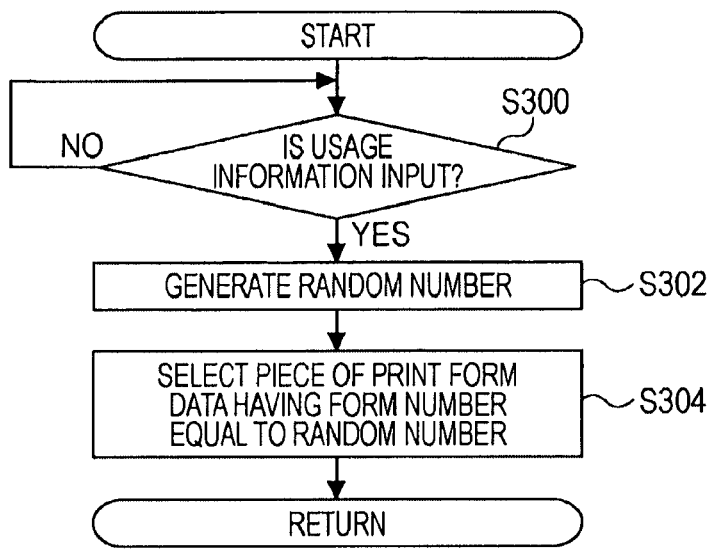
FIG. 6 is a flowchart that shows a process to select a piece of print form data when layout condition information is included in the piece of print form data in advance.

Furthermore, the flow process to select a piece of print form data when layout condition information is included in each piece of print form data in advance will be described with reference to FIG. 6. Here, FIG. 6 is a flowchart that shows the process to select a piece of print form data when layout condition information is included in each piece of print form data in advance. In the process to select a piece of print form data, as shown in FIG. 6, the process first proceeds to step 5300, and the print form data selection portion 11 determines whether usage information is input. When it is determined that usage information is input (Yes), the process proceeds to step 5302. When a negative determination is made (No), the process repeats a determination process until usage information is input.

When the process proceeds to step 5302, the print form data selection portion 11 generates a random number for selecting a piece of print form data, and then the process proceeds to step 5304. Here, as in the case described in the above, a linear congruential method, an MT (Mersenne Twister) method, or the like, may be used to generate a random number. In step 5304, the print form data selection portion 11 searches a piece of fourth searching information having a specific form number that is equal to the random number generated in step 5302, and selects (reads out) a piece of print form data, which is stored at an address included in the fourth searching information, from the print form data storage portion 12, after which a series of processes ends and the process proceeds to the original process.

Figure 7A:
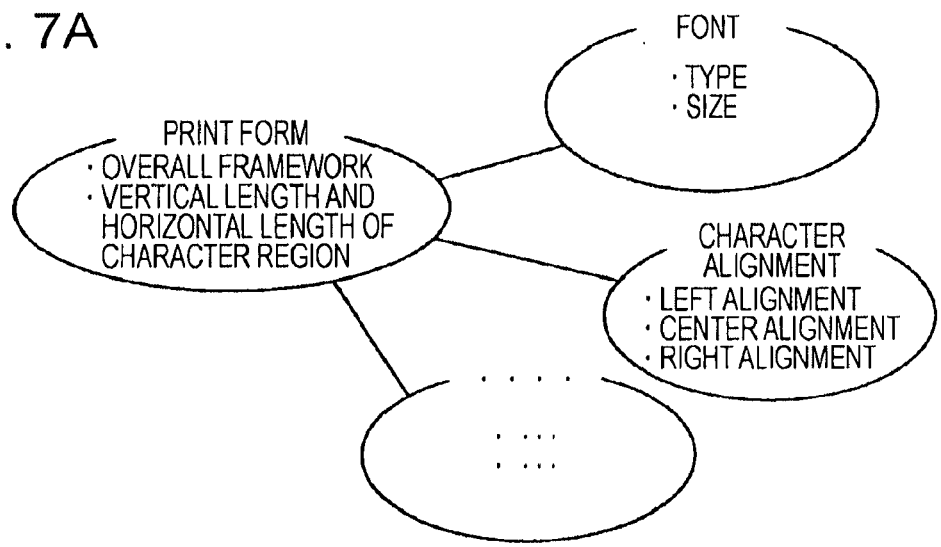
FIG. 7A is a view that shows an example of a data storage configuration of a print form data storage portion according to a first configuration.
Figure 7B:
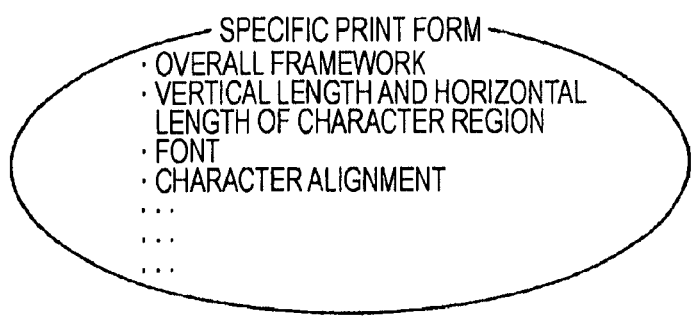
FIG. 7B is a view that shows an example of a data storage configuration of the print form data storage portion according to a second configuration.

The operation of the present embodiment will now be described with reference to FIG. 7A to FIG. 11. Here, FIG. 7A is a view that shows an example of a data storage configuration of the print form data storage portion 12 according to the first configuration, and FIG. 7B is a view that shows an example of a data storage configuration of the print form data storage portion 12 according to the second configuration. In addition, FIG. 8A to FIG. 8D are views, each of which shows an example of first to fourth pieces of searching information. Moreover, FIG. 9A to FIG. 9D are views, each of which shows an example of a printing element. Furthermore, FIG. 10 and FIG. 11 are views that respectively show first and second examples of a printing result when a piece of print form data is selected randomly.

When usage information corresponding to a selection instruction from a print instruction device (not shown), or the like, is input, the usage information input portion 1a, in the printer 10a, outputs the input usage information to the print form data selection portion 11 ("Yes" in step S100 in FIG. 4). Here, the usage information includes an instruction to print out two copies of card history. In addition, an input determination process of usage information and an output process of input usage information are performed in such a manner that an exclusive program stored in the ROM 64 is loaded onto the RAM 62, and the loaded program is executed by the CPU.

When the usage information is input from the usage information input portion 10, the print form data selection portion 11 executes the process to randomly select a piece of print form data, which is used for printing, from among pieces of print form data having the content of usage corresponding to the input usage information (step S102 in FIG. 4). Note that the process to select a piece of print form data is performed in such a manner that an exclusive program stored in the ROM 64 is loaded onto the RAM 62 and then the loaded program is executed by the CPU 60.

First, the operation of the process to select a piece of print form data according to the first configuration will be described. In this case, as shown in FIG. 7A, the data stored in the print form data storage portion 12 are pieces of print form data, in which an overall framework (information of layout content that does not include layout condition) and information of vertical length and horizontal length of each character region are set, and layout condition information, such as font type information and font size information, that determines the layout condition of each character region (note that, in FIG. 7A, the layout condition information of character alignment is included other than the above, but it is not used here).

Figures 8A, 8B, 8C, 8D, 9A, 9B, 9C, 9D:
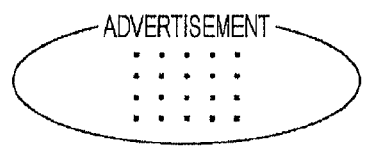
FIG. 8A to FIG. 8D are views, each of which shows an example of first to fourth pieces of searching information.
FIG. 9A to FIG. 9D are views, each of which shows an example of a printing element.

Thus, the print form data selection portion 11 first generates a random number for selecting a piece of print form data by a known MT method (step S202), and searches a piece of first searching information having a form number that is equal to the generated random number from the print form data storage portion 12. The first searching information is specifically configured to include information of a form number, the vertical length of a character region, and the storage address of a piece of print form data, as shown in FIG. 8A. Note that the information of the vertical length of a character region includes information of the vertical lengths of all the character regions.

Then, the print form data selection portion 11 acquires a piece of information concerning the vertical length of each character region included in the first searching information retrieved through the above searching from the print form data storage portion 12, and reads out (selects) a piece of print form data stored in the address that is included in the first searching information (step 8204). When the piece of print form data has been selected, the print form data selection portion 11 subsequently generates a random number for selecting font type information, which is one of the pieces of layout condition information, by a known MT method (step 8206), and searches a piece of second searching information having a font type number that is equal to the generated random number from the print form data storage portion 12. The second searching information is specifically configured to include information of a font type number and the storage address of font type information, as shown in FIG. 8B.

Then, the print form data selection portion 11 reads out (selects) a piece of font type information, which is stored at an address included in the second searching information retrieved through the above searching, from the print form data storage portion 12 (step 820B in FIG. 5). When the piece of font type information has been selected, the print form data selection portion 11 generates a random number for selecting font size information, which is one of the pieces of layout condition information, by a known MT method (step 8210 in FIG. 5), and searches a piece of third searching information having a font size number that is equal to the generated random number from the print form data storage portion 12. Here, a piece of third searching information is searched from among pieces of third searching information corresponding to multiple types of pieces of font size information in association with the selected font type. In addition, the third searching information is specifically configured to include information of a font size number, a vertical length corresponding to a font type, and the storage address of font size information in association with the font type, as shown in FIG. 8C.

Then, the print form data selection portion 11 reads out (selects) the vertical length included in the third searching information retrieved through the above searching and the font size information stored at the address that is included in the third searching information from the print form data storage portion 12 (step 8212 in FIG. 5). When the piece of font size information has been selected, the print form data selection portion 11 subsequently compares the vertical length of each character region, acquired from the first searching information, with the vertical length corresponding to the font size acquired from the third searching information (step 5214 in FIG. 5). When the vertical length of each character region is greater than the vertical length corresponding to the font size, the print form data selection portion 11 fixes the selected font type and font size for that character region, and then sets these fixed font type information and font size information for the selected piece of print form data ("Yes" in step 5216 in FIG. 5). On the other hand, when the vertical length of each character region is greater than the vertical length corresponding to the font size, a random number is generated again to thereby search a piece of third searching information, and the vertical length and font size information are selected (step 5212 in FIG. 5).

The above comparison process and the determination process are executed on each character region that is set in each piece of print form data. Next, the operation of the process to select a piece of print form data according to the second configuration will be described. In this case, as shown in FIG. 7B, pieces of print form data stored in the print form data storage portion 12 correspond to data that include pieces of layout condition information, such as overall framework (information of layout position of each printing element), the vertical length and horizontal length of each character region, font type information, font size information, and character position information.

Thus, the print form data selection portion 11 first generates a random number for selecting a piece of print form data by a known MT method (step 8302 in FIG. 6), and searches a piece of fourth searching information having a form number that is equal to the generated random number from the print form data storage portion 12. The fourth searching information is specifically configured to include information of a specific form number and a storage address of a piece of print form data, as shown in FIG. 8D.

Then, the print form data selection portion 11 reads out (selects a piece of print form data, which is stored at an address included in the fourth searching information retrieved through the above searching, from the print form data storage portion 12 (step 8304 in FIG. 6). In the above first configuration or the above second configuration, when a piece of print form data is selected, the printing element data selection portion 13 subsequently executes a process to select a piece of printing element data in accordance with the selection mode that is set in advance.

Here, when the set selection mode is a random selection mode ("Yes" in step 8104 in FIG. 4), the printing element data selection portion 13 generates a random number by a known MT method for information of layout content of each printing element that is set in the selected piece of print form data, searches a piece of printing element data having the same number as the random number from among multiple types of pieces of printing element data corresponding to the content of usage of each piece of print form data and each attribute indicated by information of each target layout content from the printing element data storage portion 14, and then reads out (selects) a piece of printing element data retrieved through the above searching from the printing element data storage portion 14 (step 8106 in FIG. 4). Note that the process to select a piece of printing element data (steps 8104 and 8106 in FIG. 4) is performed in such a manner that an exclusive program stored in the ROM 64 is loaded onto the RAM 62 and then the loaded program is executed by the CPU 60 (this also applies to step 8114).

Here, the content of usage is card history, so that, for example, information of layout content corresponding to an attribute, such as a table image (ruled line and text) that shows a detailed statement, a table image (ruled line and text) that shows an amount billed, advertisement information (image data), or the like, is set in each piece of print form data. A table image or an advertisement image corresponding to information of these layout contents is randomly selected from the printing element data storage portion 14 using a random number.

On the other hand, when the set selection mode is a sequential selection mode ("No" in step S104 in FIG. 4), the printing element data selection portion 13 reads out (selects) a piece of printing element data from among multiple types of pieces of printing element data corresponding to the content of usage of each piece of print form data and the attribute indicated by information of each target layout content in a predetermined sequence that is set in advance from the printing element data storage portion 14 (step S114 in FIG. 4). For example, the selection may be made in a sequence (descending sequence or ascending sequence) of serial numbers that are associated with pieces of printing element data.

When a piece of printing element data corresponding to the selected piece of print form data is selected as described above, the printing element data insertion portion 15 subsequently inserts the selected piece of printing element data on the basis of information of each layout content that is set in the selected piece of print form data (step S108 in FIG. 4). Note that the process to insert a piece of printing element data is performed in such a manner that an exclusive program stored in the ROM 64 is loaded onto the RAM 62 and then the loaded program is executed by the CPU 60. In addition, specifically, the insertion of printing element data is performed so that an image of each selected piece of printing element data for each layout position that is set in each piece of print form data is incorporated into each layout position on the basis of the corresponding layout condition, and then a piece of image, in which all the selected pieces of printing elements (table image or advertisement image) are arranged at the set layout positions is formed.

For example, as shown in FIG. 1a, three character regions and two image regions are set for a piece of print form data. The table image of a detailed statement, the table image of an amount billed and the character image "USE SYSTEMATICALLY" are incorporated into three character regions, and the advertisement images "BEER" and "XX HOTEL" are incorporated into the two image regions, so that a piece of image that incorporates therein the three character regions and the two image regions are generated. By executing the above process to select a piece of print form data, in the process to select a piece of printing element data and in the process to insert a piece of printing element data for the number of prints (here, two copies) specified in the usage information, two sheets of pieces of print form data (image data), into which pieces of printing element data, which are selected randomly or in a predetermined sequence, are inserted respectively into the randomly selected pieces of print form data, are generated.

For example, the second image is formed so that, as shown in FIG. 11, the size and layout content of each character region and each image region are different from one another and, for the table image of a detailed statement, font type, font size and the vertical length and horizontal length of each character region are different from one another. That is, two sheets of pieces of print form data, having the same purpose of usage but having different layout contents of printing elements, are generated. The print data generating portion 16 converts the generated two sheets of pieces of print form data into data that represent on/off of each pixel to thereby generate print data of a format that may be interpreted by the printing portion 17 (step S110 in FIG. 4). Note that the process to generate print data is performed in such a manner that an exclusive program stored in the ROM 64 is loaded onto the RAM 62 and then the loaded program is executed by the CPU 60.

When the print data have been generated, the printing portion 17 sequentially prints out two images that are formed by the inserted printing elements on printing media on the basis of the above two sheets of pieces of print data (step S112 in FIG. 4). Note that the printing process is performed in such a manner that an exclusive program stored in the ROM 64 is loaded onto the RAM 62, the loaded program is executed by the CPU 60, and then the output device 72 (the hardware of the printing portion 17, such as print head 200) is controlled on the basis of print control signals from the CPU 60.

That is, as shown in FIG. 10 and FIG. 11, because two images having different layout contents of printing elements (particularly, layout positions) are printed, there is a possibility that nozzles that are not used for printing the first sheet may be used for printing the second sheet. Here, the number of prints is two; however, when a greater number of prints are printed, the layout position of each printing element changes randomly sheet by sheet. Thus, the number of nozzles that are not used will be further reduced.

Here, the amount of ink discharged to prevent ink from clogging in nozzles will be described. Generally, a minimum standard amount of discharged ink required in order to prevent nozzle clogging, is determined. This minimum standard is determined as a criterion in which m or more number of dots printed in n seconds is required. Thus, when printing on print paper is considered, it is not particularly necessary to make the number of dots printed per one sheet of printed result be m or above. For example, when the printer 100 can print p sheets per n seconds, it is only necessary for all the nozzles to print m or more number of dots per p sheets. Particularly, a line head printer, which completes printing by a single scanning, has a head arranged in a line above a sheet of paper in order to print out at high speed, so that multiple sheets of paper may be printed per one second. In addition, n seconds range from a few seconds to several tens of seconds, so that it is sufficient to perform printing of standard m or more number of dots in units of multiple sheets of paper.

That is, when printing is continuously performed on multiple sheets of paper, because layout positions of printing elements are randomly changed sheet by sheet, it is possible to improve probability by which the number of dots formed by each nozzle per n seconds is equal to or larger than m. As described above, the printer 100 according to the first embodiment is able to randomly select a piece of print form data, which is used for printing, from among multiple types of pieces of print form data in which layout contents are set in advance sheet by sheet for the specified number of prints according to the content of usage.

In addition, according to the first configuration, it is possible to not only randomly select a piece of print form data that include information of layout condition corresponding to the attribute of each printing element from among multiple types of pieces of print form data, but also randomly select the layout condition of each printing element. On the other hand, according to the second configuration, it is possible to randomly select a piece of print form data that include information of layout position corresponding to the attribute of each printing element and layout condition information of each printing element from among the multiple types of pieces of print form data.

In addition, for the thus randomly selected piece of print form data, it is possible to select a piece of printing element data corresponding to each piece of information of layout content from among the multiple pieces of printing element data randomly or in a predetermined sequence. Furthermore, it is possible to insert the selected piece of printing element data into the piece of print form data and generate print data using the inserted piece of print form data, and then it is possible to print out an image on the basis of the print data.

As described above, because an image that randomly changes its layout contents for each print may be printed, it is possible to improve the frequencies of use of nozzles of the print head 200 (reduce nozzles that are not used). In addition, according to the above first configuration, because layout condition may also be randomly selected, it is possible to reduce storage capacity for print form data.

On the other hand, according to the second configuration, because a piece of print form data used for printing is randomly selected from among pieces of print form data in which layout condition is set, it is possible to select a piece of print form data used for printing in a single selection process. In this manner, for example, when a large number of prints are performed continuously, it is possible to execute the process more quickly as compared to the above first configuration. In the above first embodiment, the print form data selection portion 11 may be regarded as the print form data selection unit of the first aspect, the print form data storage portion 12 may be regarded as the print form data storage unit of anyone of the first, eighth and tenth aspects and the layout condition information storage unit of the fourth aspect, the printing element data selection portion 13 may be regarded as the printing element data selection unit of the first aspect or the second aspect, the printing element data storage portion 14 may be regarded as the printing element data storage unit of anyone of the first, second, third, eighth and tenth aspects, and the printing element data insertion portion 15 may be regarded as the printing element data insertion unit of the first aspect.

Moreover, in the above first embodiment, the processing function of the print form data selection portion 11 to select layout condition information may be regarded as the layout condition information selection unit of the fourth aspect, and the processing function of the print form data selection portion 11 to set the selected layout condition information into print form data may be regarded as the layout condition information setting unit of the fourth aspect. Furthermore, in the above first embodiment, the step S102 of FIG. 4 may be regarded as the print form data selection step of the eighth aspect or the tenth aspect, the steps S104, S106, S114 may be regarded as the printing element data selection step of the eighth aspect or the tenth aspect, and the step S108 may be regarded as the printing element data insertion step of the eighth aspect or the tenth aspect.

Second Embodiment

Next, a second embodiment of the invention will be described with reference to the accompanying drawings. FIG. 12 to FIG. 23 are views that show a second embodiment of a printer, a printing program and a printing method according to the invention.

Figure 12:
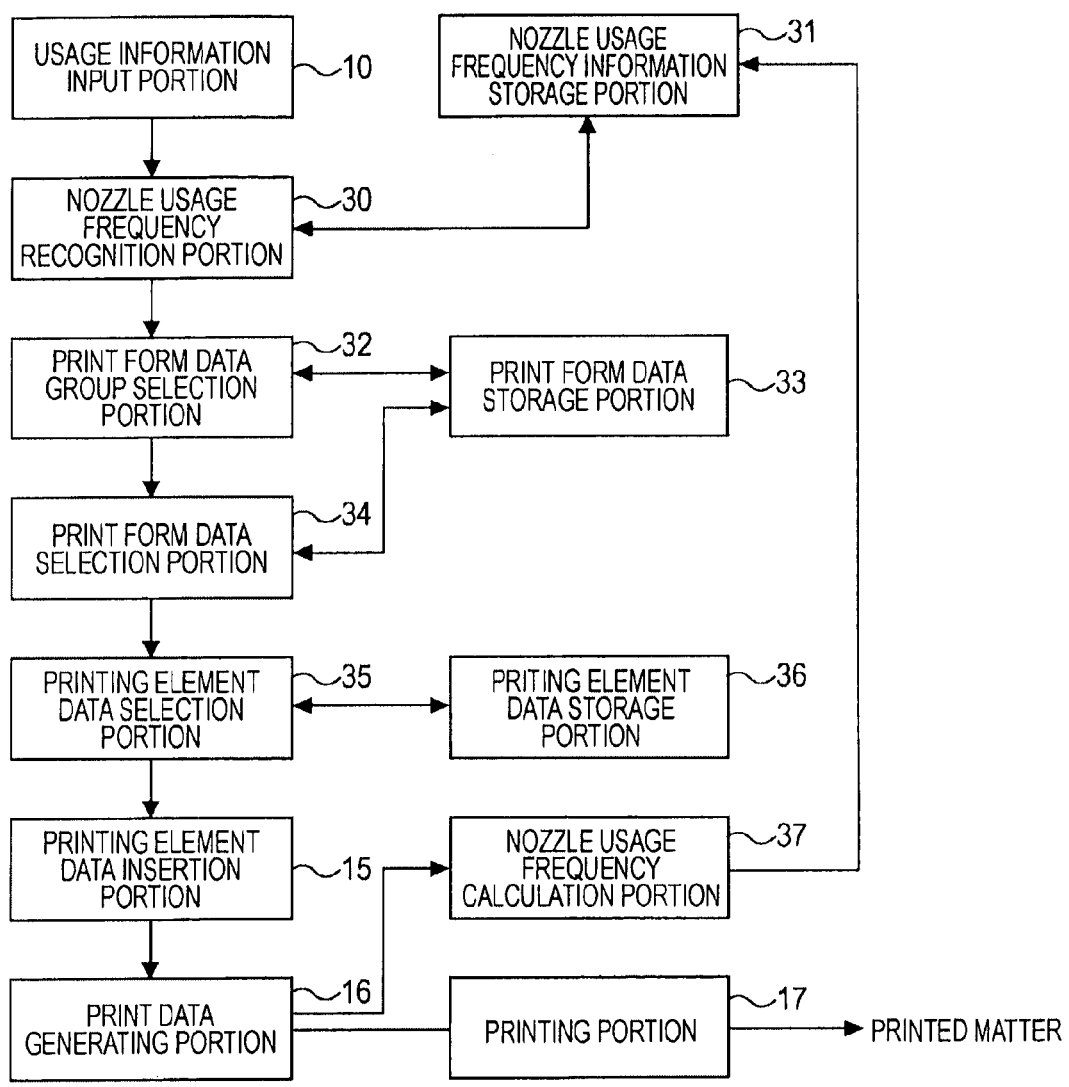
FIG. 12 is a block diagram that shows the configuration of a printer according to a second embodiment of the invention.

First, the configuration of the printer according to the second embodiment of the invention will be described with reference to FIG. 12. FIG. 12 is a block diagram that shows the configuration of a printer 300 according to the second embodiment of the invention. The present embodiment differs from the first embodiment in that, on the basis of the frequencies of nozzles used for print form data that are printed for a past predetermined period, the frequencies of use of nozzles in the predetermined period are recognized, and a piece of print form data used for printing is selected on the basis of the recognized content. In addition, the present embodiment also differs from the first embodiment in that each piece of print form data is stored in association with the average frequencies of use of nozzles when printing is performed using the piece or print form data, and each piece of printing element data is stored in association with the frequencies of use of nozzles when an image of the piece of printing element data is printed.

Hereinafter, the portions that differ from those of the first embodiment will be described in detail, and the same reference numerals are assigned to the overlapping portions and the description thereof will be omitted. First, the configuration of the printer according to the second embodiment of the invention will be described with reference to FIG. 12. FIG. 12 is a block diagram that shows the configuration of the printer 300 according to the second embodiment of the invention.

As shown in FIG. 12, the printer 300 includes the usage information input portion 10, a nozzle usage frequency recognition portion 3D, a nozzle usage frequency information storage portion 31, a print form data group selection portion 32, a print form data storage portion 33, a print form data selection portion 34, a printing element data selection portion 35, and a printing element data storage portion 36. The nozzle usage frequency recognition portion 30 recognizes the frequency of use of each nozzle. The nozzle usage frequency information storage portion 31 stores information of nozzle usage frequencies for a piece of print form data that has been printed before. The print form data group selection portion 32 selects a group of pieces of print form data corresponding to the recognized content from the print form data storage portion 33, which will be described later. The print form data storage portion 33 stores pieces of print form data in association with information regarding the frequencies of use of nozzles. The print form data selection portion 34 selects a piece of print form data used for printing from the selected group of pieces of print form data. The printing element data selection portion 35 selects a piece of printing element data corresponding to the selected piece of print form data from the printing element data storage portion 36, which will be described later. The printing element data storage portion 36 stores pieces of printing element data in association with information regarding the frequencies of use of nozzles.

The nozzle usage frequency recognition portion 30 has a function of recognizing the frequencies of use of nozzles in a predetermined period on the basis of usage frequency information of each nozzle for a piece of print form data that has been printed in the predetermined period before and which is stored in the nozzle usage frequency information storage portion 31. Specifically, on the basis of information of the frequencies of use of nozzles in a past predetermined period, the moving average of the frequencies of use of the nozzles of the print head 200 is calculated (for each ink color), and a distribution (distribution for all ink colors) of the frequencies of use of nozzles in a predetermined period is recognized from the calculated moving average. For example, it is recognized that the frequencies of nozzle usage is high or low to the left in the nozzle array direction of the print head 200.

Here, the frequencies of nozzle usage may be, for example, obtained by calculating information (projection information) that indicates the total number of dots in each 71 image line in a printed target image for every image of each color using a piece of print form data that has been color converted into CMYK. The number of dots formed by each nozzle may be obtained from this projection information. The nozzle usage frequency information storage portion 31 has a function of storing the frequencies of nozzle usage that are calculated by a nozzle usage frequency calculation portion 37, which will be described later, for a piece of print form data used for printing in association with a period of time during which the piece of print form data is printed. Here, the nozzle usage frequencies are calculated using the number of printing dots (projection information) of nozzles corresponding to each ink color.

The print form data group selection portion 32 has a function of selecting a group corresponding to the content recognized by the nozzle usage frequency recognition portion 30 from among a plurality of print form data groups that are grouped according to the content of information regarding the nozzle usage frequencies for each piece of print form data (hereinafter, referred to as print form nozzle information) and that are stored in the print form data storage portion 33.

The print form data storage portion 33, as described above, has a function of storing multiple types of pieces of print form data, which are grouped according to the content of print form nozzle information, according to the content of usage. Note that, in regard to groups of pieces of print form data, serial numbers are assigned to the groups according to the content of usage of a printed matter, and, furthermore, in each group, serial numbers are assigned to pieces of print form data. Thus, the print form data storage portion 33 has a database configuration that uses these serial numbers as searching information.

The print form data selection portion 34 has a function of selecting a piece of print form data, which is used for printing, in a predetermined sequence or randomly from the group selected by the print form data group selection portion 32 in accordance with a selection mode that is set in advance. That is, the print form data selection portion 34, in the present embodiment, has two modes as the selection mode: a sequential selection mode and a random selection mode.

The printing element data selection portion 35 has a function of selecting a printing element data group corresponding to each piece of layout content information and each piece of print form nozzle information on the basis of information of layout content of each printing element that is set in each piece of print form data selected by the print form data selection portion 34 and each piece of print form nozzle information from the printing element data storage portion 36. The printing element data selection portion 35 also has a function of selecting a piece of printing element data corresponding to the piece of layout content information from the group of pieces of printing element data that is selected in the selection mode that is set in the print form data selection portion 34. That is, in the printing element data selection portion 35, when the sequential selection mode is set, a piece of printing element data will be selected in a predetermined sequence, and, when the random selection mode is set, a piece of printing element data will be selected randomly.

The printing element data storage portion 36 has a function of storing multiple types of pieces of printing element data that are grouped according to the content of information regarding the frequencies of nozzle usage when an image of each piece of printing element data is printed (hereinafter, referred to as printing element nozzle information) according to the content of usage of a printed matter and also according to the attribute of each printing element. Note that, in regard to the pieces of printing element data stored in the printing element data storage portion 36, serial numbers are assigned to groups of pieces of printing element data according to the content of usage of a printed matter and also according to the attribute of each printing element, such as character or image, and, furthermore, in each group, serial numbers are assigned to pieces of printing element data. Thus, the printing element data storage portion 36 has a database configuration that uses these serial numbers as searching information.

Furthermore, as shown in FIG. 12, the printer 300 further includes the printing element data insertion portion 15, the print data generating portion 16, the printing portion 17, and the nozzle usage frequency calculation portion 37. The printing element data insertion portion 15 inserts a piece of printing element data that is selected by the printing element data selection portion 13 into a piece of print form data. The print data generating portion 16 generates print data using the piece of print form data into which a piece of printing element data is inserted. The printing portion 17 prints out an image on the basis of the print data. The nozzle usage frequency calculation portion 37 calculates the frequencies of use of the nozzles of the print head 200 for print data on the basis of the print data.

The nozzle usage frequency calculation portion 37 has a function of calculating the frequencies of use of the nozzles of the print head 200 on the basis of print data with which printing has been performed by the printing portion 17. Specifically, projection information is calculated from print data that are generated by the print data generating portion 16. Here, the projection information is information concerning the number of dots formed by each nozzle when an image of a piece of print form data, into which a piece of printing element data is inserted, is printed.

In addition, the printer 300, as well as the printer 100 according to the first embodiment, is provided with a computer system, which is equivalent to the one shown in FIG. 3, that implements the usage information input portion 10, the nozzle usage frequency recognition portion 30, the nozzle usage frequency information storage portion 31, the print form data group selection portion 32, the print form data selection portion 34, the printing element data selection portion 35, the printing element data insertion portion 15, the print data generating portion 16, the printing portion 17, the nozzle usage frequency calculation portion 37, and the like. The hardware configuration of the printer 300, as shown in FIG. 3, connects, using various internal and external buses 68 formed of a PCI (peripheral Component Interconnect) bus, and the like, among a CPU (Central Processing Unit) 60 that executes various controls and processes for printing, a RAM (Random Access Memory) 62 that constitutes a main storage device (Main Storage), a ROM (Read Only Memory) 64 that is a read only storage device, and connects a storage device (Secondary Storage) 70, such as HDD (Hard Disk Drive) that constitutes the nozzle usage frequency information storage portion 31, the print form data storage portion 33, the printing element data storage portion 36, and the like, the output device 72, such as the printing portion 17, a CRT, or an LCD monitor, the input device 74, such as the usage information input portion 10, an operation panel, a mouse, a keyboard, or a scanner, and a network L for communication with a print instruction device (not shown), or the like, to the buses 68 through an input/output interface (I/F) 66.

Then, when the power is turned on, a system program of BIOS, or the like, stored in the ROM 64, or the like, loads various exclusive computer programs, which are stored in the ROM 64 in advance, onto the RAM 62. In accordance with the instructions described in the programs loaded onto the RAM 62, the CPU 60 uses various resources to execute a predetermined control and processing, thus implementing the above described functions through the software.

Figure 13:
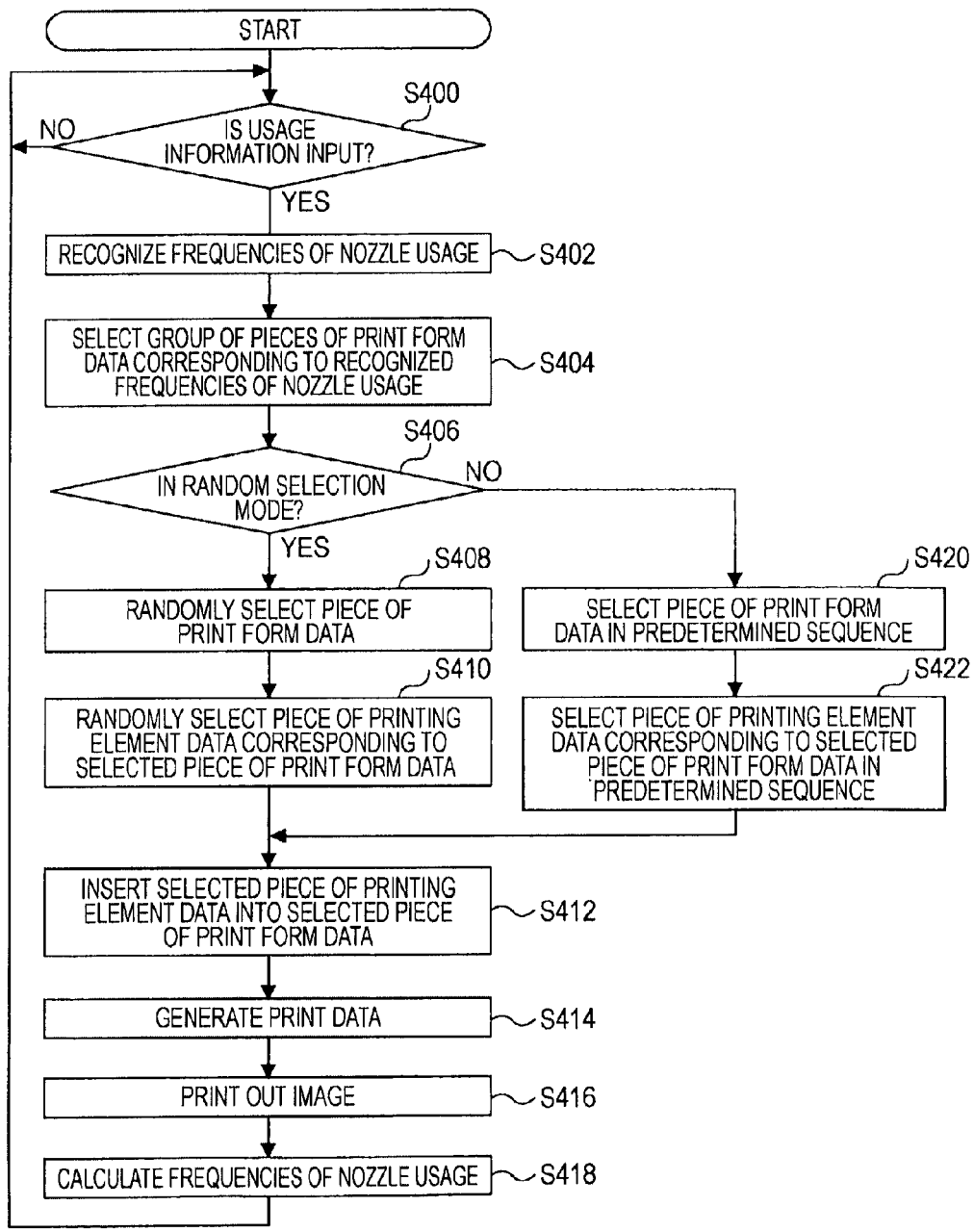
FIG. 13 is a flowchart that shows a printing process executed in the printer.

Next, the flow of a printing process in the above configured printer 300 will be described with reference to FIG. 13. Here, FIG. 13 is a flowchart that shows a printing process executed in the printer 300. The printing process, as shown in FIG. 13, first proceeds to step S400, and the usage information input portion 10 determines whether usage information is input from a print instruction terminal, or the like (not shown), such as a personal computer. When it is determined that usage information is input (Yes), the input usage information is output to the nozzle usage frequency recognition portion 30 and then the process proceeds to step S402. When a negative determination is made (No), the process repeats a determination process until usage information is input.

When the process proceeds to step S402, the nozzle usage frequency recognition portion 30 recognizes the frequencies of use of the nozzles of the print head 200 in a past predetermined period on the basis of nozzle usage frequency information in the past predetermined period, stored in the nozzle usage frequency information storage portion 31, and outputs the recognized content and the usage information to the print form data group selection portion 32, and then the process proceeds to step 8404.

In step 8404, the print form data group selection portion 32 selects a print form data group corresponding to the input usage information and the content recognized in step 402 from the print form data storage portion 33, and then the process proceeds to step 8406. In step 8406, the print form data selection portion 34 determines whether the random selection mode is set as the selection mode. When the random selection mode is set (Yes), the process proceeds to step 8408. When a negative determination is made (No), the processes proceeds to step 8420.

In step 8408, the print form data selection portion 34 randomly selects a piece of print form data used for printing from the group of pieces of print form data selected in step 8404, and then the process proceeds to step 8410. In step 8410, the printing element data selection portion 35 selects a group of pieces of printing element data corresponding to pieces of layout content information and pieces of print form nozzle information that are set in the piece of print form data selected in step 8408 from the printing element data storage portion 36, and randomly selects a piece of printing element data corresponding to each piece of layout content information from each selected group, and then the process proceeds to step 8412.

In step 8412, the printing element data insertion portion 17 inserts a piece of printing element data selected in step 5410 or in step 5422 into the corresponding piece of print form data selected in step 5408 on the basis of each piece of layout content information and each piece of layout condition information, and then the process proceeds to step 5414. In step 8414, the print data generating portion 16 generates print data on the basis of the piece of print form data into which each piece of printing element data is inserted in step 5412, and then the process proceeds to step 5416.

In step 8416, the printing portion 17 prints out an image, formed by the piece of printing element data that is inserted in step 5412, on the basis of the print data generated in step 5414, and then the process proceeds to step 5418. In step 5418, the nozzle usage frequency calculation portion 37 calculates the frequencies of use of the nozzles of the print head 200 for print data, which is printed in step 416, on the basis of the print data, and information of the calculated nozzle usage frequencies is stored in the nozzle usage frequency information storage portion 31, after which a series of processes ends and the process proceeds to step 5400.

On the other hand, in step 5406, when not the random selection mode, but the sequential selection mode is set, and the process proceeds to step 5420, the print form data selection portion 34 selects a piece of print form data used for printing from the print form data group selected in step 5404 in a predetermined sequence, and then the process proceeds to step 5422. In step 5422, the printing element data selection portion 35 selects a group of pieces of printing element data corresponding to a piece of layout content information and a piece of print form nozzle information that are set in the piece of print form data selected in step 420 from the printing element data storage portion 36 in a sequence that is set in advance, and randomly selects a piece of printing element data corresponding to each piece of layout content information from each selected group, and then the process proceeds to step 5412.

Figure 14:
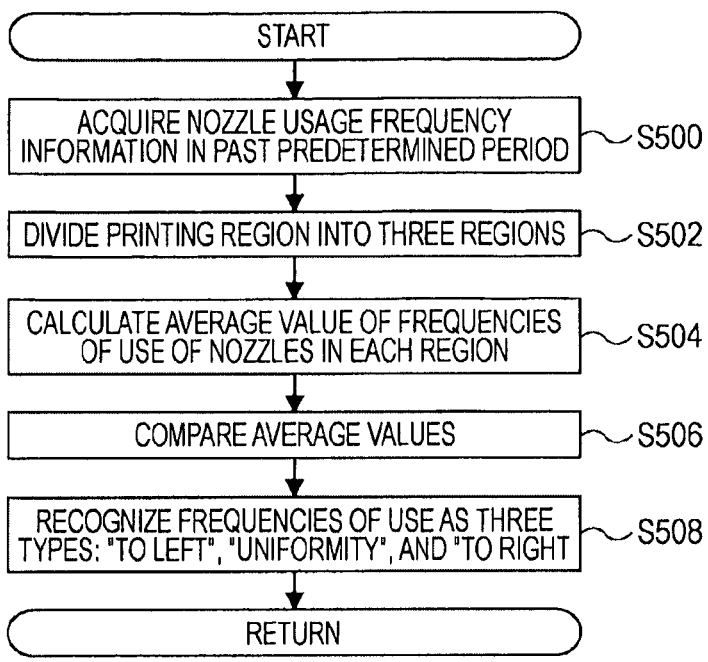
FIG. 14 is a flowchart that shows a process to recognize the frequencies of nozzle usage in a nozzle usage frequency recognition portion.

Furthermore, the flow of nozzle usage frequency recognition process executed in the nozzle usage frequency recognition portion 30 will be described with reference to FIG. 14. Here, FIG. 14 is a flowchart that shows the process to recognize the frequencies of nozzle usage in the nozzle usage frequency recognition portion 30. In the nozzle usage frequency recognition process, as shown in FIG. 14, the process first proceeds to step 8500, and the nozzle usage frequency recognition portion 30 acquires a piece of nozzle usage frequency information for print data that have been printed in a past predetermined period from the nozzle usage frequency information storage portion 31, and then the process proceeds to step 8502.

In step S502, the nozzle usage frequency recognition portion 30 divides a printing region of each piece of print data that has been printed in a past predetermined period into three so that the adjacent regions half overlap each other, and then the process proceeds to step 8504. In step S504, the nozzle usage frequency recognition portion 30 calculates the average value of the nozzle usage frequencies for each of the regions (all for a predetermined period) that are divided in step S502, and then the process proceeds to step 8506.

In step 8506, the nozzle usage frequency recognition portion 30 compares the average values of the nozzle usage frequencies of the regions, calculated in step 8504, to one another, and then the process proceeds to step 8508. In step S508, the nozzle usage frequency recognition portion 30 recognizes, on the basis of the comparison result in step 8506, the region that has the lowest average value of nozzle usage frequencies as the distribution of three groups "to left", "uniformity" and "to right", after which a series of processes ends and the process proceeds to the original process.

In the present embodiment, the recognition of the above distribution is made in such a manner that a predetermined threshold is compared with the average value of each region and, when only the average value of the left region is equal to or lower than the threshold value, it is determined that the distribution is deviated to the left, only the average value of the right region is equal to or lower than the threshold value, it is determined that the distribution is deviated to the right, and other than those, it is determined that the distribution is uniform.

The operation of the present embodiment will now be described with reference to FIG. 15 to FIG. 23. First, grouping of pieces of print form data will be described with reference to FIG. 15 to FIG. 19B.

Figure 15:
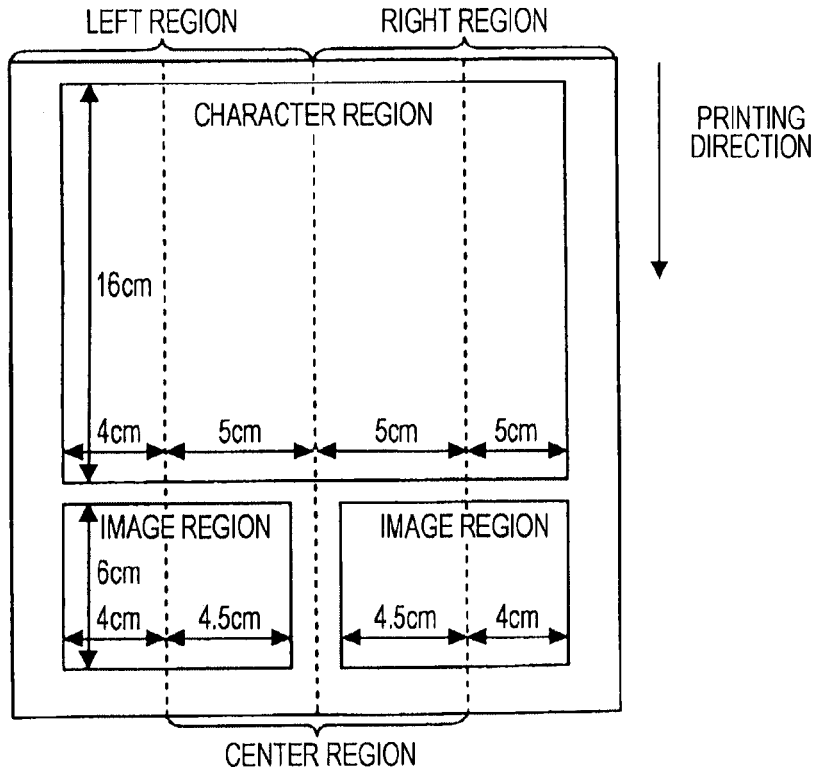
FIG. 15 is a view that shows a first example of the size of a character region and the size of image regions when a piece of print form data is divided into three regions.
Figure 16:
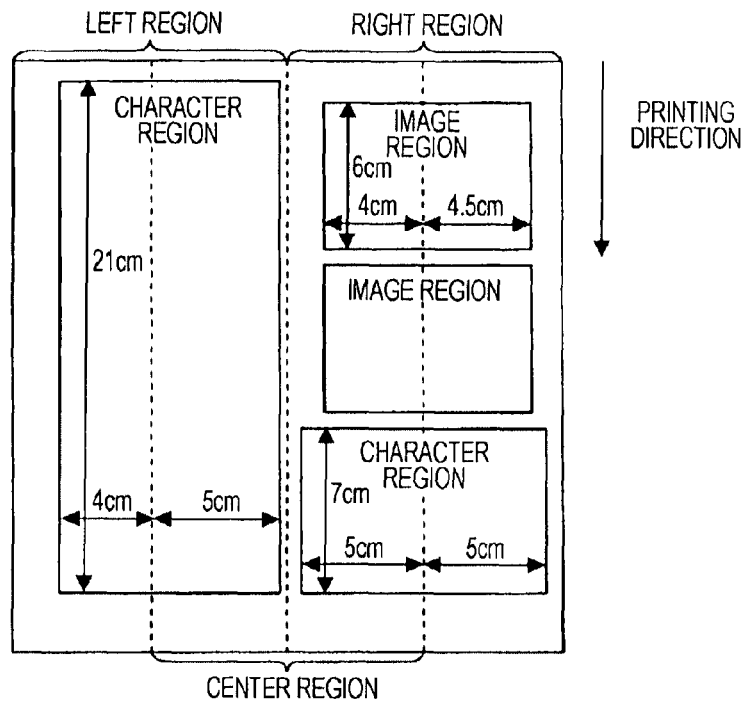
FIG. 16 is a view that shows a second example of the size of character regions and the size of image regions when a piece of print form data is divided into three regions.
Figure 17:
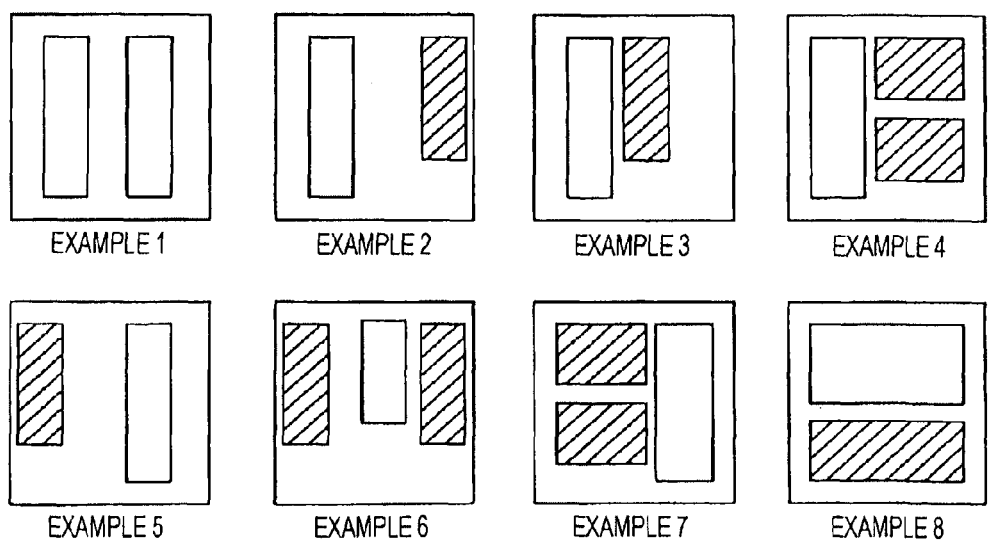
FIG. 17 is a view that shows pieces of print form data (example 1 to example 8).

FIG. 15 is a view that shows a first example of the size of a character region and the size of image regions when a piece of print form data is divided into three regions. FIG. 16 is a view that shows a second example of the size of character regions and the size of image regions when a piece of print form data is divided into three regions. FIG. 17 is a view that shows pieces of print form data (example 1 to example 8). FIG. 18 is a view that shows the comparison results between a score of each region, defined in each of the pieces of print form data shown in FIG. 17, and a threshold value. FIG. 19A is a view that shows a group configuration when grouping is performed with respect to CMYK, and FIG. 19B is a view that shows a group configuration when CMYK are separated into CMY and K and grouping is performed separately with respect to each of CMY and K.

As is described in the above first embodiment, in each of the pieces of print form data, pieces of printing element data for insertion are grouped into data that are inserted into a character region, which is an insertion region for a table image, a text sentence, or the like, and data that are inserted into an image region, which is an insertion region for an advertisement image, a photographic image, or the like. Normally, character images are often black and, therefore, the frequency of use of K ink increases in the character region. On the other hand, various colors are used in the image region, so that the frequencies of use of C, M, Y and K inks increase. Accordingly, through the presence or absence of a character region and an image region and the relationship of the arrangement between a character region and an image region in a print form, it is possible to estimate where the percentages of use of C, M, Y, and K inks are high or are low.

In addition, for example, the frequencies of use of C, M, Y, and K inks are high when a large number of advertisement images are printed, and the averages of the frequencies of use of colors are progressively uniform. On the contrary, in the case of text printing, the frequencies of use of C, M, and Y inks are low. Moreover, the dot density is high in the image region and low in the character region. When all the nozzles are used to print out an image of one sheet of paper (one page), it is possible to reduce clogging of nozzle. Furthermore, as the frequency of use of each nozzle increases, clogging of each nozzle may be further reduced.

That is, it is better to use the nozzles as much as possible and to increase the frequency of use of each nozzle when an image of one sheet of paper (one page) is printed. Specifically, as the number of dots used for printing in a direction perpendicular to a printing direction (nozzle array direction) is large, the frequency of use of each nozzle increases. Taking the above fact into consideration, for grouping pieces of print form data, first, a score is given to each image region and each character region that are set in a large number of pieces of print form data prepared in advance.

In the present embodiment, in association with dot density, each of the image regions is given a score of one point per a vertical length of 2 [cm] by a horizontal length of 1 [cm], and each of the character regions is given a score of one point per a vertical length of 8 [cm] by a horizontal length of 1 [cm]. Then, as shown by the dotted line in FIG. 15, an image forming region (printing region) is divided into quarters. By using two adjacent regions among the quartered regions, the image forming region is separated into three regions, which are a left region, a center region and a right region, as shown in FIG. 15.

For example, in the case of a print form (layout content) shown in FIG. 15, when the image forming region is divided into three regions and then a score is given to each of the regions as in the manner described above, the left region gets "$(6\div2)\times8.5+16\div8)\times9=43.5$ [points]", the center region gets "$(6\div2)\times9+16\div8)\times10=47$ [points]", and the right region gets "$(6\div2)\times8.5+16\div8)\times10=43.5$ [points]". In addition, for example, in the case of a print form (layout content) shown in FIG. 16, when the image forming region is divided into three regions and then a score is given to each of the regions as in the manner described above, the left region gets "$0+(21\div8)\times9=23.625$ [points], the center region gets "$(6\div2)\times4\times2+(21\div8)\times5+(7\div8)\times5=41.5$ [points], and the right region gets" $(6\div2)\times8.5\times2+(7\div8)\times5=55.375$ [points].

As shown in the example of FIG. 16, the score of the left region in which the character region occupies a relatively large area is less than a half of the score of the right region in which the image region occupies a relatively large area. That is, in the case of printing that uses four color CMYK inks, because the character region substantially uses only K ink, the frequencies of nozzle usage with respect to CMYK ink colors are determined to be low (a score is set to be lower).

When a score is given to all of the pieces of print form data prepared in advance in accordance with the above manner, a distribution (deviation) of ink usage frequencies for all the nozzles used on each piece of print form data may be obtained. Specifically, by setting a threshold value, a determination is made by comparing the threshold value with the frequency of use of each region. For example, in printing that uses four color CMYK inks, the threshold value is set to 30 points and then is compared with the score of each region. In the first example shown in FIG. 15, because the scores of all of the regions are higher than 30 points, it is determined that the piece of print form data gives uniform frequencies of use in all the nozzles. In addition, in the second example shown in FIG. 16, because only the score of the left region is lower than 30 points, it is determined that the piece of print form data gives the frequencies of nozzle usage that are deviated to the right region.

In addition, in the case of printing that uses three color CMY inks, because C, M, and Y inks are also used to perform printing in the character region, in this case, the threshold value for scoring is, for example, set to 20 points. By decreasing the threshold value as compared to the case of four CMYK colors used as described above, because the scores of all the regions are larger than 20 points, for example, in the second example shown in FIG. 16, it is determined that the frequencies of nozzle usage on this piece of print form data are uniform in all the nozzles. By managing a distribution of the frequencies of nozzle usage using the scores as in the manner described above, even when CMY and K are separated, it is possible to manage the frequencies of nozzle usage in the same manner as the one that does not separate CMY from K.

Furthermore, FIG. 18 is a view that shows an example of the results when the pieces of print form data of layout contents shown in the examples 1 to 8 in FIG. 17 are grouped in such a manner that a score is given to each region of each of the pieces of print form data and then a determination is made to each of the regions defined in each of the examples 1 to 8. In FIG. 18, the symbol "x" in the column of each region represents that the score of that region is lower than the threshold value, and the symbol "0" represents that the score of that region is equal to or higher than the threshold value. In addition, in the column of grouping, "RIGHT" indicates the group of which the frequencies of nozzle usage are deviated to the right region, "LEFT" indicates the group of which the frequencies of nozzle usage are deviated to the left region, and "UNIFORMITY" indicates the group of which the frequencies of nozzle usage are uniform over all the printing region.

In addition, "EXCLUDED" in the column of grouping indicates a piece of print form data, for which it is determined to be desirably excluded, because the ink usage frequencies are low over all the regions (the scores are smaller than the threshold value) or the ink usage frequencies of at least any-one of the regions are extremely high or low. That is, because nozzles tend to be easily clogged when the ink usage frequencies are extremely low and also it is not preferable when the frequencies of use are extremely high, pieces of print form data of the above layout contents are excluded from the print form data storage portion 33.

The pieces of print form data that are grouped as shown in FIG. 18 are grouped into three groups, which are "TO LEFT", "UNIFORM", and "TO RIGHT", as shown in FIG. 19A, according to a distribution of the frequencies of nozzle usage. The thus grouped pieces of print form data are stored in the print form data storage portion 33 according to the content of usage.

Note that the example shown in FIG. 19A shows an example of grouping when four color CMYK inks are grouped together; however, when three color CMY inks and K ink are separated, a group configuration will be the one shown in FIG. 19B. That is, as shown in FIG. 19B, pieces of print form data are grouped into two groups: a group corresponding to three color CMY inks and a group corresponding to K ink. Next, the group corresponding to three color CMY inks is grouped into three groups, which are "TO LEFT", "UNIFORMITY", and "TO RIGHT", according to a distribution of the frequencies of nozzle usage. On the other hand, similarly, the group corresponding to K ink is grouped into three groups, which are "TO LEFT", "UNIFORMITY", and "TO RIGHT", according to a distribution of the frequencies of nozzle usage.

Note that all pieces of print form data are grouped according to the content of usage, and the example shown in FIG. 19A and the example shown in FIG. 19B each correspond to a piece of print form data of a certain content of usage. Next, grouping of pieces of printing element data corresponding to an image region will be described with reference to FIG. 20A to FIG. 20B. Here, FIG. 20A is a view that shows the relationship between a piece of printing element data corresponding to an image region and the frequency of use of nozzles corresponding to each ink color, and FIG. 20B is a view that shows a group configuration of pieces of printing element data corresponding to an image region when grouping is performed on the basis of the relationship of FIG. 20A.

First, in grouping pieces of printing element data (for example, advertisement image data, or the like) corresponding to the image region, the frequencies of use of nozzles corresponding to each color used to print out an image of each piece of printing element data are extracted and then the most frequently used ink color is associated with that piece of printing element data. For example, when the print head used for printing is compatible with four CMYK ink colors, the percentage of C used, the percentage of M used, the percent-age of Y used and the percentage of K used for each piece of printing element data are extracted as shown in FIG. 20A. Specifically, by obtaining projection information through color conversion of each piece of printing element data, the percentages of use of nozzles of ink colors corresponding to each piece of printing element data are extracted.

Then, as shown in the association column shown in FIG. 20A, the most frequently used ink color is associated with a serial number (hereinafter, referred to as object number) that is associated with each piece of printing element data corresponding to the image region. In this manner, as shown in FIG. 20B, pieces of printing element data corresponding to the image region are grouped into four groups, which are "PERCENTAGE OF C USED IS HIGH", "PERCENTAGE OF M USED IS HIGH", "PERCENTAGE OF Y USED IS HIGH", and "PERCENTAGE OF K USED IS HIGH". The thus grouped pieces of print form data are stored in the printing element data storage portion 36 according to the content of usage.

Next, the operation of the printer 300 in a state where the pieces of print form data and the pieces of printing element data, which are grouped as described above, are respectively stored in the print form data storage portion 33 and the printing element data storage portion 36 will be described with reference to FIG. 21A to FIG. 23. Note that, in the present embodiment, information of average frequency of use of nozzles corresponding to each ink color for each piece of print form data (print form nozzle information) is assigned to each piece of print form data.

Figure 22:
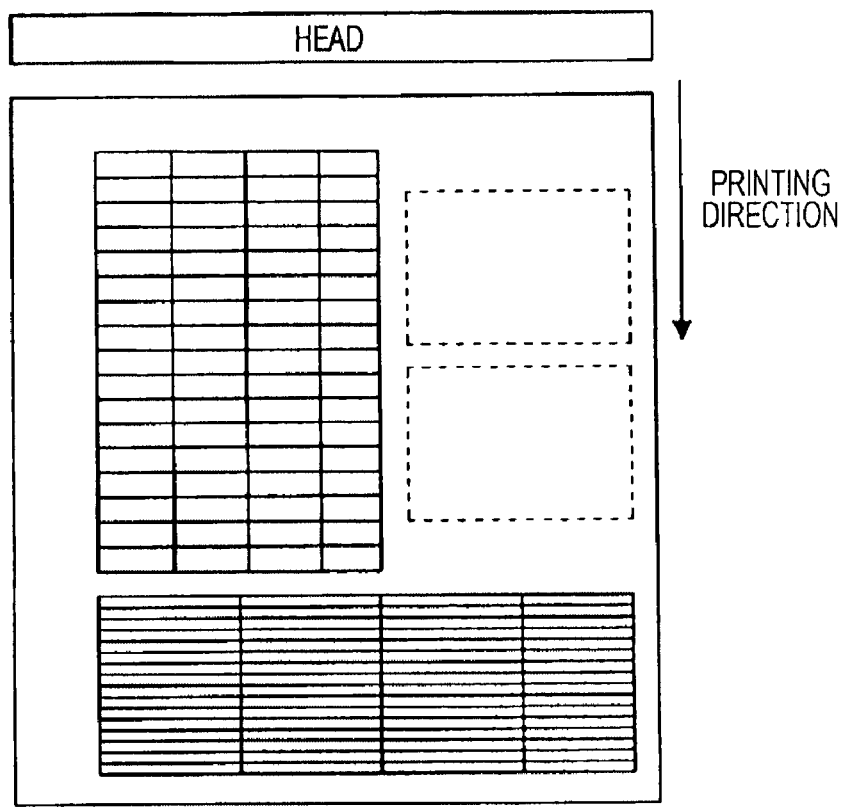
FIG. 22 is a view that shows a first example of the relationship between a piece of print form data and an average value of nozzle usage frequencies.
Figure 22:
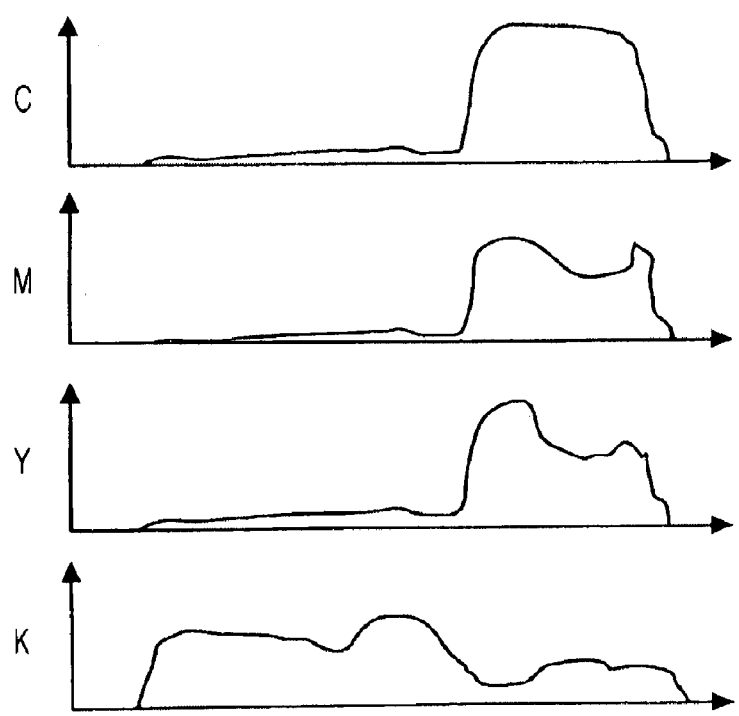
Figure 23:
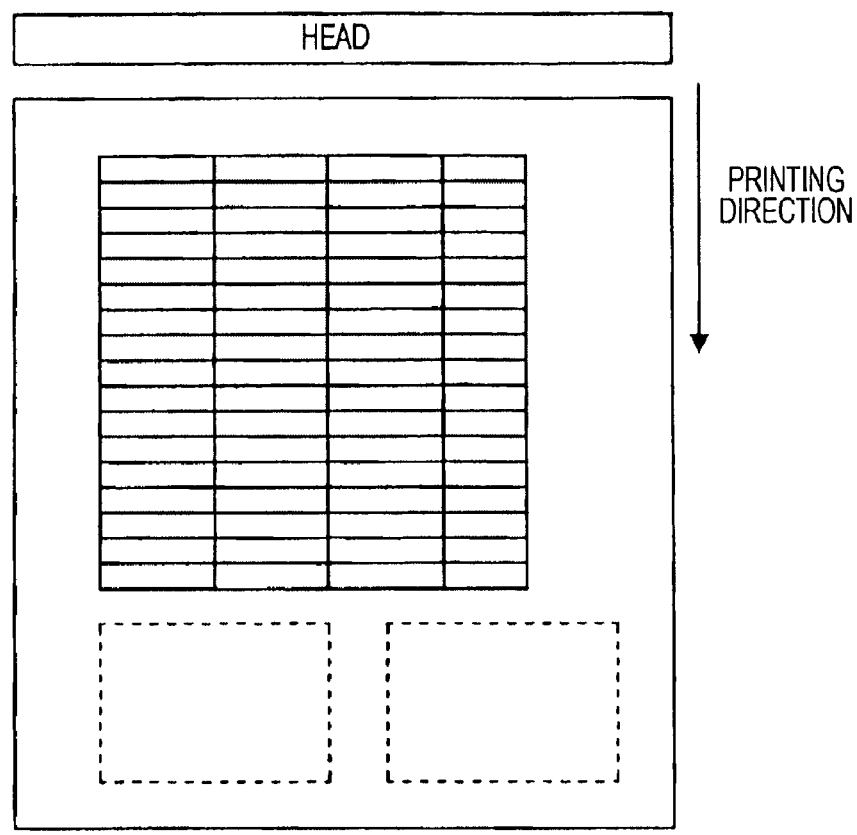
FIG. 23 is a view that shows a second example of the relationship between a piece of print form data and an average value of nozzle usage frequencies.
Figure 23:
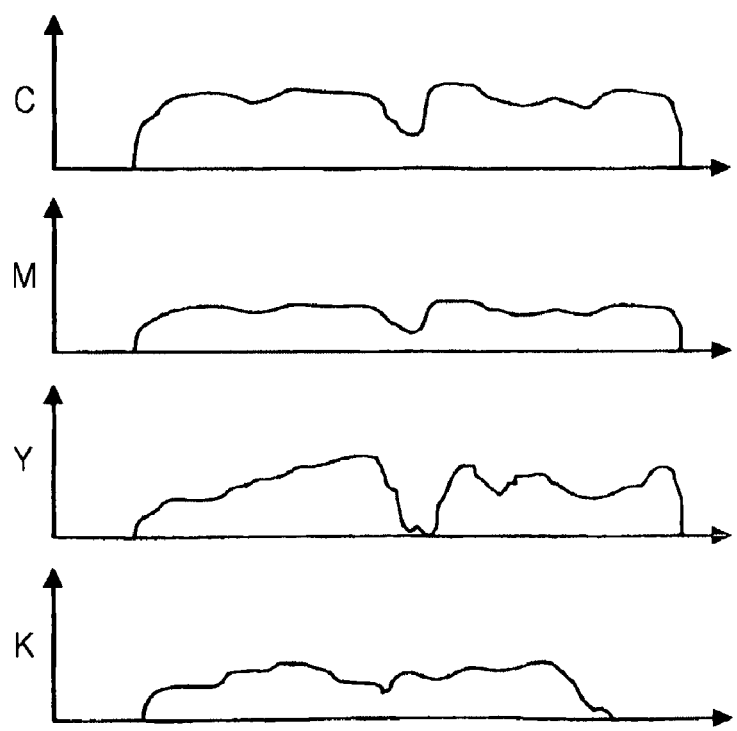

FIG. 21A is a view that shows an example of dividing of a printing region in a process to recognize the frequencies of nozzle usage, and FIG. 21B is a view that shows an example of a moving average that is obtained for each divided region shown in FIG. 21A. FIG. 22 is a view that shows a first example of the relationship between a piece of print form data and an average value of nozzle usage frequencies. FIG. 23 is a view that shows a second example of the relationship between a piece of print form data and an average value of nozzle usage frequencies.

When usage information corresponding to a selection instruction from a print instruction device (not shown), or the like, is input, the usage information input portion 10 (see FIG. 1), in the printer 300, outputs the input usage information to the nozzle usage frequency recognition portion 30 ("Yes" in step 8400 in FIG. 13). Here, the usage information includes an instruction to print out two copies of a pay slip. In addition, an input process of usage information and an output process of input usage information are performed in such a manner that an exclusive program stored in the ROM 64 is loaded onto the RAM 62, and the loaded program is executed by the CPU 60.

The nozzle usage frequency recognition portion 30 (see FIG. 12), when usage information is input from the usage information input portion 10 (see FIG. 12), executes a process to recognize the frequencies of use of nozzles in a past predetermined period (step 8402 of FIG. 13). Note that the process to recognize nozzle usage frequencies is performed in such a manner that an exclusive program stored in the ROM 64 is loaded onto the RAM 62 and then the loaded program is executed by the CPU 60.

The nozzle usage frequency recognition portion 30 acquires nozzle usage frequency information for a piece of print form data that has been printed in a past predetermined period (for example, past ten seconds, or the like) from the nozzle usage frequency information storage portion 31 (step 8500 in FIG. 14). When the nozzle usage frequency has been acquired, the printing region (image forming region) is divided into three regions (1) to (3) as shown in FIG. 21A (step 8502 in FIG. 14), and then, for each region, the total value of the frequencies of nozzle usage in the predetermined period is calculated. When the total values have been calculated, the average value of the frequencies of nozzle usage corresponding to each region is calculated (step 8504 in FIG. 14). In this manner, the average value (moving average value) of nozzle usage frequencies in each region in a past predetermined period is calculated.

Note that the regions (1) to (3) respectively correspond to the left region, the center region, and the right region into which the above pieces of print form data are grouped. Subsequently, each of the moving average values in the above three regions is compared with a threshold value that is set in advance (step S506 in FIG. 14), and, on the basis of the result of comparison, the frequencies of nozzle usage in a past predetermined period are recognized as three groups "TO LEFT", "UNIFORMITY", and "TO RIGHT" (step S508 in FIG. 14).

Specifically, when only the moving average value of the region (1) is lower than the threshold value, it is recognized as "TO LEFT", only the moving average value of the region (2) is lower than the threshold value, it is recognized as "TO RIGHT", and, when the moving average values of all the regions are lower than the threshold value, it is recognized as "UNIFORMITY". In this manner, when the nozzle usage frequencies in a past predetermined period have been recognized, a group of pieces of print form data according to the recognized content is selected from the print form data storage portion 33 (step S404 in FIG. 13). Note that the process to select a group of pieces of print form data is performed in such a manner that an exclusive program stored in the ROM 64 is loaded onto the RAM 62 and then the loaded program is executed by the CPU 60. Specifically, the pieces of print form data are, as described above, grouped into three groups, which are "TO LEFT", "UNIFORMITY", and "TO RIGHT", according to the content of usage, so that the group that coincides with the above recognized content ("TO LEFT", "UNIFORMITY", or "TO RIGHT") is selected.

For example, when the recognized content is "TO RIGHT", a group of pieces of print form data that are grouped into "TO RIGHT" is selected. When the group of piece of print form data has been selected, the print form data selection portion 34 subsequently selects a piece of print form data used for printing from the selected group in accordance with the set selection mode.

Here, the random selection mode is set. In addition, each piece of print form data includes layout content information that includes layout condition information. Each piece of print form data is associated with fifth searching information that includes information of a usage content number, a group number, a specific form number, the storage address of print form data, and is stored in the print form data storage portion 33. When the random selection mode is set ("Yes" in step S406 in FIG. 13), the print form data selection portion 34 first generates a random number for selecting a piece of print form data by a known MT method and searches the piece of fifth searching information having a specific form number that is equal to the generated random number from the selected group of pieces of print form data. Note that the process to select a piece of print form data is performed in such a manner that an exclusive program stored in the ROM 64 is loaded onto the RAM 62 and then the loaded program is executed by the CPU 60 (this also applies to steps S408 and S420).

Then, the print form data selection portion 34 reads out (selects) a piece of print form data stored in the address included in the fifth searching information that is retrieved through the above searching from the print form data storage portion 33 (step S408 in FIG. 13). In this manner, for example, it is assumed that the piece of print form data shown in FIG. 22 has been selected. In FIG. 22, the graph shown on the lower side to the print form image is made so that the average value of nozzle usage frequencies is graphed for each ink color when a printing element corresponding to each piece of information of layout content is inserted into the print form image. However, in calculating the frequencies of use, the average values of the frequencies of use for all pieces of insertable printing element data stored in the printing element data storage portion 36 are used.

When the piece of print form data has been selected as described above, the printing element data selection portion 35 subsequently executes a process to select a piece of printing element data in accordance with the random selection mode that is the same as the mode selecting the piece of print form data. The printing element data selection portion 35 first recognizes an ink color that is lower in frequencies of nozzle usage among pieces of print form data that belong to the selected group "TO RIGHT" on the basis of print form nozzle information assigned to the selected piece of print form data. The graph on the lower side of FIG. 22 shows that, in the selected piece of print form data, the frequency of K ink used in the right region (region (2)) is lower than the frequencies of C, M, and Y inks used.

In such a case, the printing element data selection portion 35, when selecting a piece of printing element data for each image region arranged in the right region of the print form data, first selects a group of pieces of printing element data of which the percentage of K ink used is high (percentage of K used is high) from a group of pieces of printing element data corresponding to the content of usage of print form data and the attribute (image region) indicated by information of layout content of each selected target. Then, in regard to the selected group, a random number is generated by a known MT method, and a piece of printing element data having an object number that is equal to the random number is searched from the group of which the percentage of K used is high, and then a piece of printing element data retrieved through the above searching is read out (selected) from the printing element data storage portion 36 (step 8410).

On the other hand, the printing element data selection portion 35 generates a random number by a known MT method for each piece of printing element data corresponding to the character region, searches a piece of printing element data having the same number as the random number from among multiple types of pieces of printing element data corresponding to the content of usage of the piece of print form data, and reads out (selects) the piece of printing element data retrieved through the above searching from the printing element data storage portion 36 (step 8410 in FIG. 13). Note that the process to select a piece of printing element data is performed in such a manner that an exclusive program stored in the ROM 64 is loaded onto the RAM 62 and then the loaded program is executed by the CPU 60 (this also applies to step 8422 in FIG. 13).

On the other hand, when the set selection mode is the sequential selection mode ("No" in step 8406 in FIG. 13), the print form data selection portion 34 selects a piece of print form data from the selected group of pieces of print form data in a predetermined sequence (step 8420 in FIG. 13). Then, similarly, for printing element data as well, the printing element data selection portion 35 selects a piece of printing element data from the group of pieces of printing element data selected on the basis of print form nozzle information in a sequence that is determined in advance (step 8422 in FIG. 13). For example, the selection may be made in a sequence (descending sequence or ascending sequence) of serial numbers that are associated with pieces of print form data and pieces of printing element data.

When the piece of printing element data corresponding to the selected piece of printing form data has been selected, the printing element data insertion portion 15 subsequently inserts the selected piece of printing element data into the selected piece of print form data on the basis of information of layout content that is set in each selected piece of print form data (step 8412 in FIG. 13). Note that the process to insert a piece of printing element data is performed in such a manner that an exclusive program stored in the ROM 64 is loaded onto the RAM 62 and then the loaded program is executed by the CPU 60.

Specifically, into each character region and image region of layout positions indicated by the layout content information, pieces of printing element data that are selected in correspondence with these regions are inserted to thereby form a piece of image data corresponding to one sheet of paper. The print data generating portion 16 converts the generated sheet of piece of print form data into data that represent on/off of each pixel to thereby generate print data of a format that may be interpreted by the printing portion 17 (step 8414 in FIG. 13). Note that the process to generate print data is performed in such a manner that an exclusive program stored in the ROM 64 is loaded onto the RAM 62 and then the loaded program is executed by the CPU 60.

When the print data have been generated, the printing portion 17 prints out an image that is formed by the inserted printing elements on a printing medium on the basis of the 102 above print data (step 5416 in FIG. 13). Note that the printing process is performed in such a manner that an exclusive program stored in the ROM 64 is loaded onto the RAM 62, the loaded program is executed by the CPU 60, and then the output device 72 (printing portion 17) is controlled on the basis of print control signals from the CPU 60.

In the meantime, when the first piece (first sheet) of print data has been generated, the nozzle usage frequency calculation portion 37 calculates the frequencies of nozzle usage for the print data, and stores information of the calculated nozzle usage frequencies (nozzle usage frequency information) in the nozzle usage frequency information storage portion 31. Note that the process to calculate nozzle usage frequency information is performed in such a manner that an exclusive program stored in the ROM 64 is loaded onto the RAM 62 and then the loaded program is executed by the CPU 60.

Here, because the number of prints specified in the usage information is two, for the second piece of print data, the nozzle usage frequencies in a past predetermined period is recognized using the nozzle usage frequency information for the first piece of print data, and then a group of pieces of print form data is selected on basis of this recognized content. Thereafter, as in the case of the above, a series of processes is performed and then the second piece of print data is printed. For example, it is assumed that, owing to the first print, portions that are short of nozzle usage frequencies (the frequencies of use of nozzles in the right region) are compensated, and thereby the frequencies of use are uniform over all the nozzles. In this case, as a second piece of print form data, for example, a piece of print form data that belongs to a group of which the frequencies of use of nozzles are "UNIFORMITY" as shown on the lower side of FIG. 23 is selected.

As described above, the printer 300 according to the second embodiment is able to recognize nozzle usage frequencies in a past predetermined period using the nozzle usage frequency recognition portion 30, and is able to select a group of pieces of print form data corresponding to the recognized content of nozzle usage frequencies in a past predetermined period from multiple types of groups of pieces of print form data, for which information of layout content is set in advance and which are grouped in accordance with distribution information of nozzle usage frequencies, using the print form data group selection portion 32 for each print of the specified number of prints according to the content of usage.

In addition, the printer 300 is able to select, using the print form data selection portion 34, a piece of print form data, used for printing, from the selected group of pieces of print form data in accordance with the selection mode that is set in advance. Moreover, the printer 300 is able to select a group of pieces of printing element data corresponding to the selected piece of print form data from among multiple types of groups of pieces of printing element data that are grouped in accordance with nozzle usage frequencies according to the content of usage and is able to select a piece of printing element data that is inserted into the piece of print form data from the selected group in the same mode as the selection mode set in the print form data selection portion 34 using the printing element data selection portion 35.

Yet furthermore, the printer 300 is able to insert, using the printing element data insertion portion 15, the selected piece of printing element data into the selected piece of print form data, and then is able to generate, using the print data generating portion 16, print data from the piece of print form data, into which the selected piece of printing element data has been inserted. Then, the printer 300 is able to print out, using the printing portion 17, an image on the basis of the print data. As described above, because, for each print, the frequencies of use of nozzles in a past predetermined period are recognized, a piece of print form data that uses nozzles of which the frequencies of use are low is selected and then an image may be printed, it is possible to accurately improve the frequencies of use of nozzles of the print head 200 (reduce nozzles that are not used).

In the second embodiment, the nozzle usage frequency recognition portion 30, the print form data group selection portion 32 and the print form data selection portion 34 may be regarded as the print form data selection unit of the third or sixth aspect, the print form data storage portion 33 may be regarded as the print form data storage unit of anyone of the third, sixth, ninth and eleventh aspects, the printing element data selection portion 35 may be regarded as the printing element data selection unit of anyone of the third, fourth and seventh aspects, the printing element data storage portion 36 may be regarded as the printing element data storage unit of anyone of the third, seventh, ninth and eleventh aspects, the printing element data insertion portion 15 may be regarded as the printing element data insertion unit of the third or fourth aspect, and the nozzle usage frequency calculation portion 37 may be regarded as the usage frequency calculation unit of the third aspect.

In addition, in the above second embodiment, the steps 5402 to 5408 and 5420 in FIG. 13 may be regarded as the print form data selection step of the ninth or eleventh aspect, the steps 5410 and 5422 in FIG. 13 may be regarded as the printing element data selection step of the ninth or eleventh aspect, the step 5412 in FIG. 13 may be regarded as the printing element data insertion step of the ninth or eleventh aspect, and the step 5418 in FIG. 13 may be regarded as the usage frequency calculation step of the ninth or eleventh aspect.

Note that, in the above second embodiment, the print form data include layout condition information (the second configuration in the first embodiment); however, as in the case of the first embodiment, the layout condition of each printing element may be randomly selected, in addition to the configuration that the first configuration is applied and a piece of print form data that includes a piece of information of layout position corresponding to the attribute of each printing element.

According to the above configuration, because a layout condition may also be randomly selected, it is possible to reduce storage capacity for print form data. Note that, in the above second embodiment, the pieces of print form data are grouped in accordance with a distribution (deviation) of the frequencies of nozzle usage; however, the grouping is not limited to this. The grouping may be performed according to a further segmented distribution, or may be performed by another method.

In addition, in the first embodiment, layout condition information is randomly selected only for a character region; however, regions for which layout condition information is randomly selected are not limited to the character regions. Layout condition information may be randomly selected for an image region as well. The layout condition information of an image region corresponds to, for example, information of resolution, information of palette (limitations of color representation, and the like), information of a type of algorithm when an image is reduced or enlarged to be adjusted to the size of a layout region, and the like.

In addition, in the first and second embodiments, the layout condition information includes two types of information, which are font type information and font size information; however, the layout condition information is not limited to them. The layout condition information may include other pieces of information, such as character alignment, character spacing, line space, and margin. Moreover, the feature of the printer 100 according to the above first embodiment and the feature of the printer 300 according to the above second embodiment are is it is possible to improve the frequencies of nozzle usage using the manner of selection of a piece of print form data and a piece of printing element data without substantially adding any additional components to the existing printer itself. Thus, it is not necessary to particularly provide an exclusive component as the printing portion 17, and it is possible to use the existing ink jet printer as it is. Furthermore, when the printing portion 17 is separated from the printer 100 and the printer 300 according to the above first and second embodiments, the functions of the printing portion 17 may be implemented by a general purpose print instruction terminal, such as a personal computer, a printer server, or the like.

In addition, in the above first and second embodiments, an exclusive computer program stored in the ROM 64 is loaded onto the RAM 62 to be executed by the CPU 60; however, the configuration is not limited to this. The programs may be installed in the storage device 70 through a storage medium, such as a CD-ROM, a DVD-ROM, a flexible disk (FD), or may be installed in the storage device 70 through a communication network, such as the internet and then loaded onto the RAM 62 to be executed by the CPU 60.

What is claimed is:

1. A printer that includes a line head in which nozzles forming an image by discharging ink are arranged in a plurality of lines, wherein the printer prints out an image on the basis of print form data in which information of layout contents of printing elements forming a content of a print is set according to an attribute of each printing element, the printer comprising:
    a print form data storage unit that stores multiple pieces of print form data, which include different layout contents of the printing elements according to a content of usage;
    a printing element data storage unit that stores multiple types of pieces of printing element data, which correspond to pieces of data of the printing elements according to the attribute of each printing element;
    a print form data selection unit that selects a piece of print form data, which is used for printing, from among the multiple pieces of print form data stored in the print form data storage unit;
    a printing element data selection unit that selects a piece of printing element data corresponding to each piece of information of layout content that is set in the selected piece of print form data from among the multiple types of pieces of printing element data stored in the printing element data storage unit; and
    a printing element data insertion unit that inserts the selected piece of printing element data into the selected piece of print form data on the basis of information of the content of print, which is set in the selected piece of print form data.

2. The printer according to claim 1, wherein
    the print form data selection unit randomly selects the piece of the print form data, which is used for printing, from among the multiple pieces of print form data stored in the print form data storage unit.

3. The printer according to claim 1, wherein
the print element data selection unit randomly selects the piece of printing element data corresponding to each piece of information of the layout content set in the selected piece of the print form data from among the multiple types of pieces of the printing element data that are stored in the printing element data storage unit.

4. The printer according to claim 1, wherein
the information of layout content includes information of layout position of each printing element and information that indicates a layout condition corresponding to the attribute of each printing element,
the information of layout position corresponding to each piece of printing element is set in advance in each piece of print form data,
the printer further includes
a layout condition information storage unit that stores multiple types of pieces of the layout condition information according to the attribute of each printing element,
a layout condition information selection unit that randomly selects a piece of layout condition information of a printing element for information of each layout content set in the selected piece of print form data from among the multiple types of pieces of layout condition information stored in the layout condition information storage unit, and
a layout condition information setting unit that sets the piece of layout condition information, which is selected by the layout condition information selection unit, to the selected piece of print form data, and
the printing element data insertion unit inserts the piece of printing element data, which is selected by the printing element data selection unit, into the piece of print form data to which the piece of layout condition information is set.

5. The printer according to claim 1, further comprising
a usage frequency calculation unit that calculates the frequencies of use of the nozzles on the basis of the piece of print form data, into which the piece of the printing element data has been inserted and which has been printed before, wherein
the print form data storage unit that stores the multiple pieces of the print form data, according to the content of the usage and in association with print form nozzle information that is information regarding the frequencies of the use of the nozzles when printing is performed on the basis of the print form data, and
the print form data selection unit that selects the piece of the print form data on the basis of the calculated frequencies of the use from among the multiple pieces of the print form data that are stored in the print form data storage unit.

6. The printer according to claim 5, wherein
the print form nozzle information includes information that indicates a distribution of the frequencies of use of the plurality of nozzles when printing is performed based on the print form data.

7. The printer according to claim 5, wherein
the multiple pieces of print form data are grouped into a plurality of groups according to the content of the print form nozzle information and then stored in the print form data storage unit, and wherein
the print form data selection unit selects a group of pieces of print form data on the basis of the calculated frequencies of use from among the plurality of groups of pieces of print form data that are stored in the print form data storage unit, and randomly selects a piece of print form data, which is used for printing, from the selected group.

8. The printer according to claim 7, wherein
the multiple types of pieces of printing element data are grouped into a plurality of groups according to a content of printing element nozzle information regarding frequencies of use of the nozzles when an image of the printing element data is printed and then stored in the printing element data storage unit, and
the printing element data selection unit selects a group of printing element data for each piece of information of layout content set in the selected piece of print form data based on calculated frequencies of use from among the multiple types of pieces of printing element data stored in the printing element data storage unit for each layout content, and randomly selects a piece of printing element data for each layout content from each selected group.

9. A printing system that controls a printer that includes a line head in which nozzles that form an image by discharging ink are arranged in a plurality of lines, wherein the printer prints out an image on the basis of print form data in which information of layout contents of printing elements that form a content of print is set according to an attribute of each printing element, wherein the printing program is used to execute a process on a computer, the system comprising:
a printing form data selecting unit that selects a piece of print form data, which is used for printing, on the basis of the calculated frequencies of use from among multiple pieces of print form data that are stored in a print form data storage unit that stores the multiple pieces of print form data, which include different layout contents of the printing elements, according to the content of usage and in association with print form nozzle information that is information regarding the frequencies of use of the nozzles when printing is performed based on the print form data;
a printing element data selecting unit that selects a piece of printing element data for each piece of information of layout content that is set in the selected piece of print form data from among multiple types of pieces of printing element data stored in a printing element data storage unit that stores the multiple types of pieces printing element data, which correspond to pieces of data of the printing elements, according to the attribute of each printing element; and
a printing element data inserting unit that inserts the selected piece of printing element data into the selected piece of print form data based on information of the content of print, which is set in the selected piece of print form data.

10. A printing system comprising:
a printing unit that includes a line head in which nozzles that form an image by discharging ink are arranged in a plurality of lines;
a print form data storage unit that stores multiple pieces of print form data; and
a print form data selecting unit that selects a piece of print form data which is used for printing, from the multiple pieces of the print form data stored in the print form a data storage unit,
the printing unit printing each piece of information of content that is set in the selected piece of the print form data.

* * * * *